United States Patent
Farag et al.

(10) Patent No.: US 12,048,017 B2
(45) Date of Patent: Jul. 23, 2024

(54) STRUCTURE OF MESSAGE FROM USER EQUIPMENT TO BASE STATION IN 2-STEP RANDOM ACCESS

(71) Applicant: Nokia Technologies Oy, Espoo (FI)

(72) Inventors: Emad Farag, Flanders, NJ (US); Frank Frederiksen, Klarup (DK); Nuno Manuel Kiilerich Pratas, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 278 days.

(21) Appl. No.: 17/422,941

(22) PCT Filed: Feb. 11, 2020

(86) PCT No.: PCT/FI2020/050084
§ 371 (c)(1),
(2) Date: Jul. 14, 2021

(87) PCT Pub. No.: WO2020/165499
PCT Pub. Date: Aug. 20, 2020

(65) Prior Publication Data
US 2022/0070941 A1   Mar. 3, 2022

Related U.S. Application Data

(60) Provisional application No. 62/825,500, filed on Mar. 28, 2019, provisional application No. 62/806,389, filed on Feb. 15, 2019.

(51) Int. Cl.
*H04W 74/0833* (2024.01)
*H04L 5/00* (2006.01)
(Continued)

(52) U.S. Cl.
CPC ....... *H04W 74/0833* (2013.01); *H04L 5/0051* (2013.01); *H04W 52/36* (2013.01);
(Continued)

(58) Field of Classification Search
None
See application file for complete search history.

(56) References Cited

U.S. PATENT DOCUMENTS 11,259,331 B2 *  2/2022  Jeon ................... H04W 56/005
11,647,543 B2 *  5/2023  Dinan ............... H04W 74/0833
                                                       370/329

(Continued)

FOREIGN PATENT DOCUMENTS

CN    101123795 A    2/2008
CN    108282897 A    7/2018
(Continued)

OTHER PUBLICATIONS

Tentative Rejection received for corresponding Taiwan Patent Application No. 109104793, dated Jun. 12, 2023, 3 pages of Tentative Rejection and no page of translation available.

(Continued)

*Primary Examiner* — Anh Vu H Ly
(74) *Attorney, Agent, or Firm* — Brake Hughes Bellermann LLP

(57) ABSTRACT

Fallback aspects associated with the power ramping procedure are addressed. More specifically, a set of control mechanisms allows for a gNB to adjust thresholds for controlling the UE transfer from a 2-step RACH procedure to a 4-step RACH procedure while still maintaining a proper setting for transmit power during this transition. The mechanism will allow for a UE to have a smooth transition to the 4-step procedure instead of having to start the power ramping from scratch when transferring to the fall-back routine.

19 Claims, 20 Drawing Sheets

(51) Int. Cl.
  *H04W 52/36* (2009.01)
  *H04W 72/04* (2023.01)
  *H04W 72/1268* (2023.01)
  *H04W 74/0836* (2024.01)
(52) U.S. Cl.
  CPC ....... *H04W 72/04* (2013.01); *H04W 72/1268* (2013.01); *H04W 74/0836* (2024.01)

(56) References Cited

U.S. PATENT DOCUMENTS

| | | |
|---|---|---|
| 2018/0103465 A1 | 4/2018 | Agiwal et al. |
| 2018/0110074 A1 | 4/2018 | Akkarakaran et al. |
| 2018/0124822 A1 | 5/2018 | Wang et al. |
| 2018/0198646 A1 | 7/2018 | Gau et al. |
| 2018/0205516 A1 | 7/2018 | Jung et al. |
| 2018/0220450 A1 | 8/2018 | Aiba et al. |
| 2018/0279376 A1 | 9/2018 | Dinan et al. |
| 2020/0120713 A1* | 4/2020 | Yerramalli ........ H04W 74/0833 |
| 2020/0252974 A1* | 8/2020 | Akkarakaran ........ H04W 52/36 |
| 2020/0260498 A1* | 8/2020 | Xu ..................... H04W 74/0833 |
| 2020/0267772 A1* | 8/2020 | Jung ................. H04W 56/0045 |
| 2021/0219348 A1* | 7/2021 | Zhang ............... H04W 72/0453 |

FOREIGN PATENT DOCUMENTS

| | | | |
|---|---|---|---|
| CN | 108293262 | A | 7/2018 |
| CN | 109168147 | A | 1/2019 |
| EP | 3927063 | A1 | 12/2021 |
| EP | 3927093 | A1 | 12/2021 |
| TW | 201817272 | A | 5/2018 |
| WO | 2017023066 | A1 | 2/2017 |
| WO | 2018/049274 | A1 | 3/2018 |
| WO | 2018/085205 | A1 | 5/2018 |
| WO | 2018/127042 | A1 | 7/2018 |
| WO | 2018/127226 | A1 | 7/2018 |
| WO | 2018175809 | A1 | 9/2018 |
| WO | 2018/232003 | A1 | 12/2018 |

OTHER PUBLICATIONS

Office Action received for corresponding Vietnam Patent Application No. 1-2021-05567, dated Aug. 16, 2023, 2 pages of Office Action and 2 pages of translation available.
Office Action received for corresponding Vietnam Patent Application No. 1-2021-05567, dated Oct. 15, 2021, 1 page of Office Action and 1 page of translation available.
Extended European Search Report received for corresponding European Patent Application No. 20756211.7, dated Aug. 5, 2022, 11 pages.
"New Radio (NR) Access Technology", 3GPP TSG RAN meeting #77, RP-171783, Agenda: 9.2.1, NTT Docomo Inc, Sep. 11-14, 2017, pp. 1-284.
Office Action received for corresponding Indian Patent Application No. 202147038102, dated Mar. 21, 2022, 9 Pages.
"New work item: 2-step RACH for NR", 3GPP TSG RAN Meeting #82, RP-182894, Agenda: 9.1.1, ZTE Corporation, Dec. 10-13, 2018, 5 pages.
"2-step Random Access Procedure", 3GPP TSG RAN WG1 AH_NR Meeting, R1-1700105, Agenda: 5.1.1.4.3, ZTE, Jan. 16-20, 2017, 9 pages.
"Further considerations on a 2-step RA Procedure", 3GPP TSG RAN WG1 AH_NR Meeting, R1-1700186, Agenda: 5.1.1.4.3, CATT, Jan. 16-20, 2017, 4 pages.

"2-step Random Access Procedure", 3GPP TSG RAN WG1 AH_NR Meeting, R1-1700703, Agenda: 5.1.1.4.3, InterDigital Communications, Jan. 16-20, 2017, pp. 1-4.
"NR 2-step Random Access Procedure", 3GPP TSG RAN WG1 NR Ad Hoc, R1-1700892, Agenda: 5.1.1.4.3, Samsung, Jan. 16-20, 2017, 5 pages.
International Search Report and Written Opinion received for corresponding Patent Cooperation Treaty Application No. PCT/FI2020/050083, dated May 19, 2020, 14 pages.
"Considerations on NR V2X scheduling mechanism", 3GPP TSG RAN WG1 Ad-Hoc Meeting 1901, R1-1900745, Agenda: 7.2.4.1.5, Apple, Jan. 21-25, 2019, pp. 1-5.
International Search Report and Written Opinion received for corresponding Patent Cooperation Treaty Application No. PCT/FI2020/050084, dated Jun. 15, 2020, 15 pages.
"Enhancements to initial access and mobility for NR-unlicensed", 3GPP TSG RAN WG1 Meeting #94, R1-1808686, Agenda: 7.2.2.4.2, Intel Corporation, Aug. 20-24, 2018, 4 pages.
"NR 4-step RACH procedure", 3GPP TSG-RAN WG1#89, R1-1708244, Agenda: 7.1.1.4.2, Nokia, May 15-19, 2017, 12 pages.
Tentative Rejection received for corresponding Taiwan Patent Application No. 109104793, dated Dec. 11, 2020, 8 pages of Tentative Rejection and 1 page of translation available.
Office action received for corresponding Bangladesh Patent Application No. 47/2020, dated Mar. 3, 2021, 1 page.
Office Action received for corresponding Taiwan Patent Application No. 109104793, dated Jun. 30, 2021, 4 pages of Office Action and no page of translation available.
Extended European Search Report received for corresponding European Patent Application No. 20755692.9, dated Oct. 13, 2022, 12 pages.
"2-Step RACH Procedure for NTN", 3GPP TSG RAN WG2 Meeting #105, R2-1901474, Agenda: 11.6.3.1, Nomor Research GmbH, Feb. 25-Mar. 1, 2019, 3 pages.
"Report of Email Discussion [103#55][NR-U] 2-step RACH Model and Initial Information Contents (Qualcomm)", 3GPP TSG-RAN WG2 Meeting #103bis, R2-1815564, Agenda: 11.2.1.1, Qualcomm Incorporated, Oct. 8-12, 2018, 17 pages.
Office action received for corresponding Canadian Patent Application No. 3128860, dated Oct. 12, 2022, 4 pages.
Office Action received for corresponding Argentina Patent Application No. 20200100419, dated Sep. 18, 2023, 5 pages of Office Action and no page of translation available.
"3rd Generation Partnership Project; Technical Specification Group Radio Access Network; NR; Physical layer procedures for control (Release 16)", 3GPP TS 38.213, V16.0.0, Dec. 2019, pp. 1-146.
"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.
Non-Final Office action received for corresponding U.S. Appl. No. 17/422,941, dated Oct. 23, 2023, 10 pages.
Office Action and Search Report for Chinese Application No. 202080014757.X, mailed on Dec. 26, 2023, 15 pages.
Office Action and Search Report for Chinese Application No. 202080014824.8, mailed on Dec. 25, 2023, 17 pages.
Office Action for European Application No. 20755692.9, mailed on Dec. 21, 2023, 7 pages.
3GPP TSG RAN WG1 #96, R1-1902763; "Considerations on NR V2X Scheduling Mechanism"; Agenda Item: 7.2.4.1.5; Source: Apple; Athens, Greece; Feb. 25-Mar. 1, 2019; 5 pages.

\* cited by examiner

| i | j | k | i | j | k | i | j | k | i | j | k |
|---|---|---|---|---|---|---|---|---|---|---|---|
| 0 | 0 | 0 | 16 | 0 | 2 | 32 | 0 | 4 | 48 | 1 | 2 |
| 1 | 0 | 0 | 17 | 0 | 2 | 33 | 0 | 4 | 49 | 1 | 2 |
| 2 | 0 | 0 | 18 | 0 | 2 | 34 | 1 | 0 | 50 | 1 | 2 |
| 3 | 0 | 0 | 19 | 0 | 2 | 35 | 1 | 0 | 51 | 1 | 2 |
| 4 | 0 | 0 | 20 | 0 | 2 | 36 | 1 | 0 | 52 | 1 | 3 |
| 5 | 0 | 0 | 21 | 0 | 3 | 37 | 1 | 0 | 53 | 1 | 3 |
| 6 | 0 | 0 | 22 | 0 | 3 | 38 | 1 | 0 | 54 | 1 | 3 |
| 7 | 0 | 1 | 23 | 0 | 3 | 39 | 1 | 0 | 55 | 1 | 3 |
| 8 | 0 | 1 | 24 | 0 | 3 | 40 | 1 | 1 | 56 | 1 | 3 |
| 9 | 0 | 1 | 25 | 0 | 3 | 41 | 1 | 1 | 57 | 1 | 3 |
| 10 | 0 | 1 | 26 | 0 | 3 | 42 | 1 | 1 | 58 | 1 | 4 |
| 11 | 0 | 1 | 27 | 0 | 3 | 43 | 1 | 1 | 59 | 1 | 4 |
| 12 | 0 | 1 | 28 | 0 | 4 | 44 | 1 | 1 | 60 | 1 | 4 |
| 13 | 0 | 1 | 29 | 0 | 4 | 45 | 1 | 1 | 61 | 1 | 4 |
| 14 | 0 | 2 | 30 | 0 | 4 | 46 | 1 | 2 | 62 | 1 | 4 |
| 15 | 0 | 2 | 31 | 0 | 4 | 47 | 1 | 2 | 63 | 1 | 4 |

| | RO0 4th Qtr of preambles | RO1 4th Qtr of preambles | RO2 4th Qtr of preambles | RO3 4th Qtr of preambles | RO4 4th Qtr of preambles | RO5 4th Qtr of preambles |
|---|---|---|---|---|---|---|
| Preamble2 DataTime | RO0 3rd Qtr of preambles | RO1 3rd Qtr of preambles | RO2 3rd Qtr of preambles | RO3 3rd Qtr of preambles | RO4 3rd Qtr of preambles | RO5 3rd Qtr of preambles |
| RO1 RO3 RO5 | RO0 2nd Qtr of preambles | RO1 2nd Qtr of preambles | RO2 2nd Qtr of preambles | RO3 2nd Qtr of preambles | RO4 2nd Qtr of preambles | RO5 2nd Qtr of preambles |
| RO0 RO2 RO4 | RO0 1st Qtr of preambles | RO1 1st Qtr of preambles | RO2 1st Qtr of preambles | RO3 1st Qtr of preambles | RO4 1st Qtr of preambles | RO5 1st Qtr of preambles |

Preamble2DataFreq(1)
Preamble2DataFreq(0)=0

| Slot n PRACH Slot | Slot n+1 PUSCH Slot | Slot n+2 PUSCH Slot | Slot n+3 PUSCH Slot | Slot n+4 PUSCH Slot | Slot n+5 PUSCH Slot | Slot n+6 PUSCH Slot |
|---|---|---|---|---|---|---|

FIG. 16

STRUCTURE OF MESSAGE FROM USER EQUIPMENT TO BASE STATION IN 2-STEP RANDOM ACCESS

CROSS-REFERENCE TO RELATED APPLICATIONS

This application is a nonprovisional of, and claims priority to U.S. Provisional Patent Application No. 62/825,500, filed Mar. 28, 2019, entitled "STRUCTURE OF MESSAGE FROM USER EQUIPMENT TO BASE STATION IN 2-STEP RANDOM ACCESS." This application also claims priority to U.S. Provisional Patent Application No. 62/806,389, filed Feb. 15, 2019, entitled "STRUCTURE OF MESSAGE FROM USER EQUIPMENT TO BASE STATION IN 2-STEP RANDOM ACCESS."

RELATED APPLICATION

This application was originally filed as PCT Application No. PCT/FI/2020/050084 on Feb. 11, 2020, which claims priority from U.S. Provisional Application No. 62/806,389, filed on Feb. 15, 2019 and from U.S. Provisional Application No. 62/825,500, filed on Mar. 28, 2019, which is hereby incorporated in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a user equipment (UE), information from a network, the information including power ramping data representing a power ramping schedule for a fallback from a 2-step random access channel (RACH) procedure to a 4-step RACH procedure; transmitting, by the UE, a first message to a base station (gNB) at a first power value over a physical RACH (PRACH) and a physical uplink shared channel (PUSCH) resource in time and frequency space according to the 2-step RACH procedure, the first message including a preamble configured to be transmitted over the PRACH and message data configured to be sent over the PUSCH resource, the first power value being the largest power value available for the 2-step RACH procedure; generating, by the UE, a second power value based on the power ramping schedule, the second power being an initial power value for the 4-step RACH procedure; and transmitting, by the UE, a second message to the gNB at the second power value over the PUSCH according to the 4-step RACH procedure, the second message including the preamble.

According to an example implementation, an apparatus includes at least memory and controlling circuitry coupled to the memory, the controlling circuitry being configured to receive information from a network, the information including power ramping data representing a power ramping schedule for a fallback from a 2-step random access channel (RACH) procedure to a 4-step RACH procedure; transmit a first message to a base station (gNB) at a first power value over a physical RACH (PRACH) and a physical uplink shared channel (PUSCH) resource in time and frequency space according to the 2-step RACH procedure, the first message including a preamble configured to be transmitted over the PRACH and message data configured to be sent over the PUSCH resource, the first power value being the largest power value available for the 2-step RACH procedure; generate a second power value based on the power ramping schedule, the second power being an initial power value for the 4-step RACH procedure; and transmit a second message to the gNB at the second power value over the PUSCH according to the 4-step RACH procedure, the second message including the preamble.

According to an example implementation, an apparatus includes means for receiving information from a network, the information including power ramping data representing a power ramping schedule for a fallback from a 2-step random access channel (RACH) procedure to a 4-step RACH procedure; means for transmitting a first message to a base station (gNB) at a first power value over a physical RACH (PRACH) and a physical uplink shared channel (PUSCH) resource in time and frequency space according to the 2-step RACH procedure, the first message including a preamble configured to be transmitted over the PRACH and message data configured to be sent over the PUSCH resource, the first power value being the largest power value available for the 2-step RACH procedure; means for generating a second power value based on the power ramping schedule, the second power being an initial power value for the 4-step RACH procedure; and means for transmitting a second message to the gNB at the second power value over the PUSCH according to the 4-step RACH procedure, the second message including the preamble.

According to an example implementation, a computer program product includes a computer-readable storage medium and storing executable code that, when executed by at least one data processing apparatus, is configured to cause the at least one data processing apparatus to receive information from a network, the information including power ramping data representing a power ramping schedule for a fallback from a 2-step random access channel (RACH) procedure to a 4-step RACH procedure; transmit a first message to a base station (gNB) at a first power value over a physical RACH (PRACH) and a physical uplink shared channel (PUSCH) resource in time and frequency space according to the 2-step RACH procedure, the first message including a preamble configured to be transmitted over the PRACH and message data configured to be sent over the PUSCH resource, the first power value being the largest power value available for the 2-step RACH procedure; generate a second power value based on the power ramping schedule, the second power being an initial power value for the 4-step RACH procedure; and transmit a second message to the gNB at the second power value over the PUSCH according to the 4-step RACH procedure, the second message including the preamble.

The details of one or more examples of implementations are set forth in the accompanying drawings and the description below. Other features will be apparent from the description and drawings, and from the claims.

BRIEF DESCRIPTION OF THE DRAWINGS

FIG. 5 is a table illustrating an allocation of preamble index "i" to time "1" frequency "k" resources according to an example implementation.

FIG. 16 is a diagram illustrating an alternative mapping rule according to an example implementation.

DETAILED DESCRIPTION

Figure 1A:
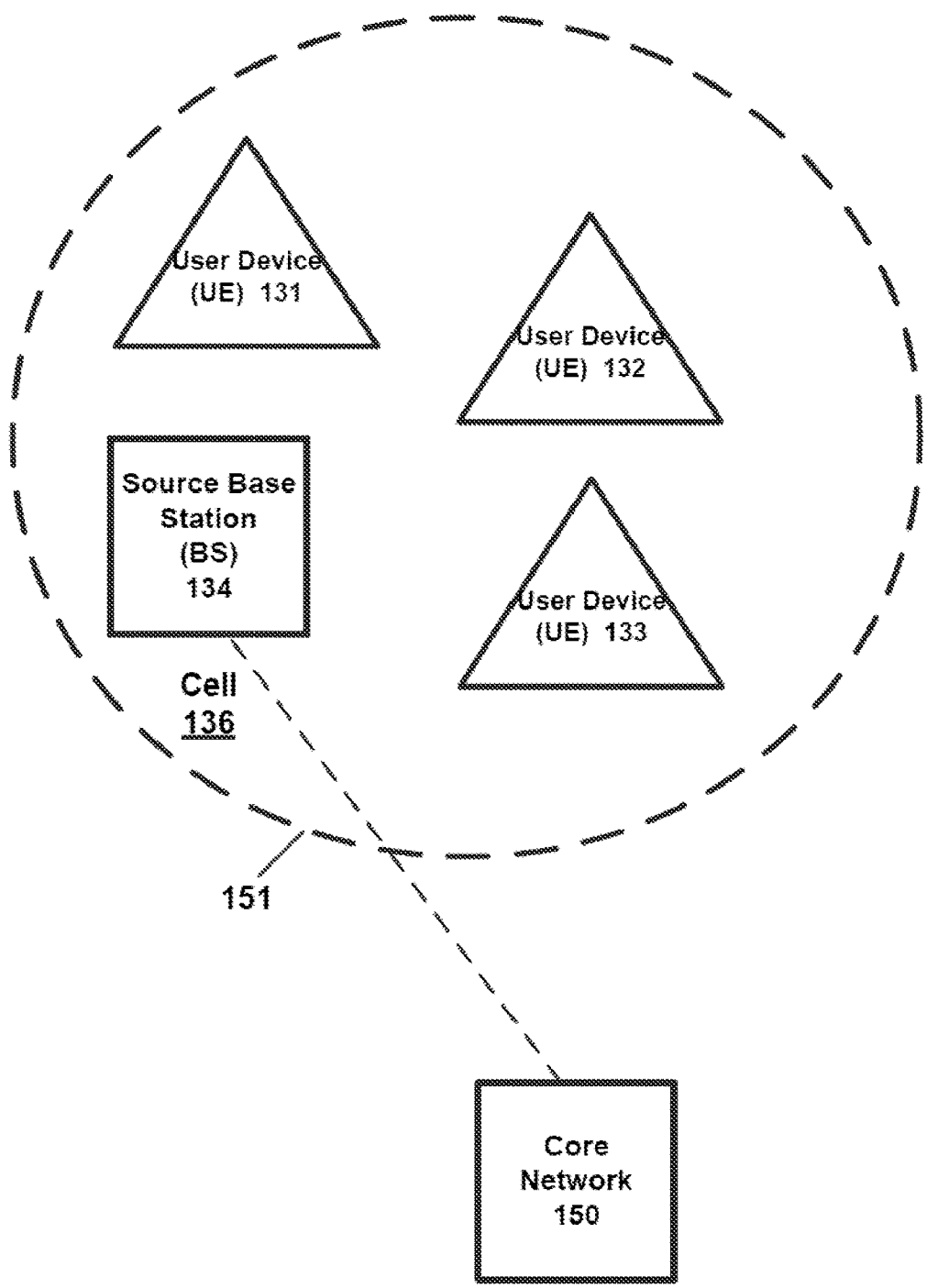
FIG. 1A is a block diagram of a wireless network according to an example implementation.

FIG. 1A is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) also may be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), enhanced mobile broadband, massive machine type communications (MMTC), vehicle-to-vehicle (V2V), vehicle-to-device, etc. Each of these use cases, or types of UEs, may have its own set of requirements.

Figure 1B:
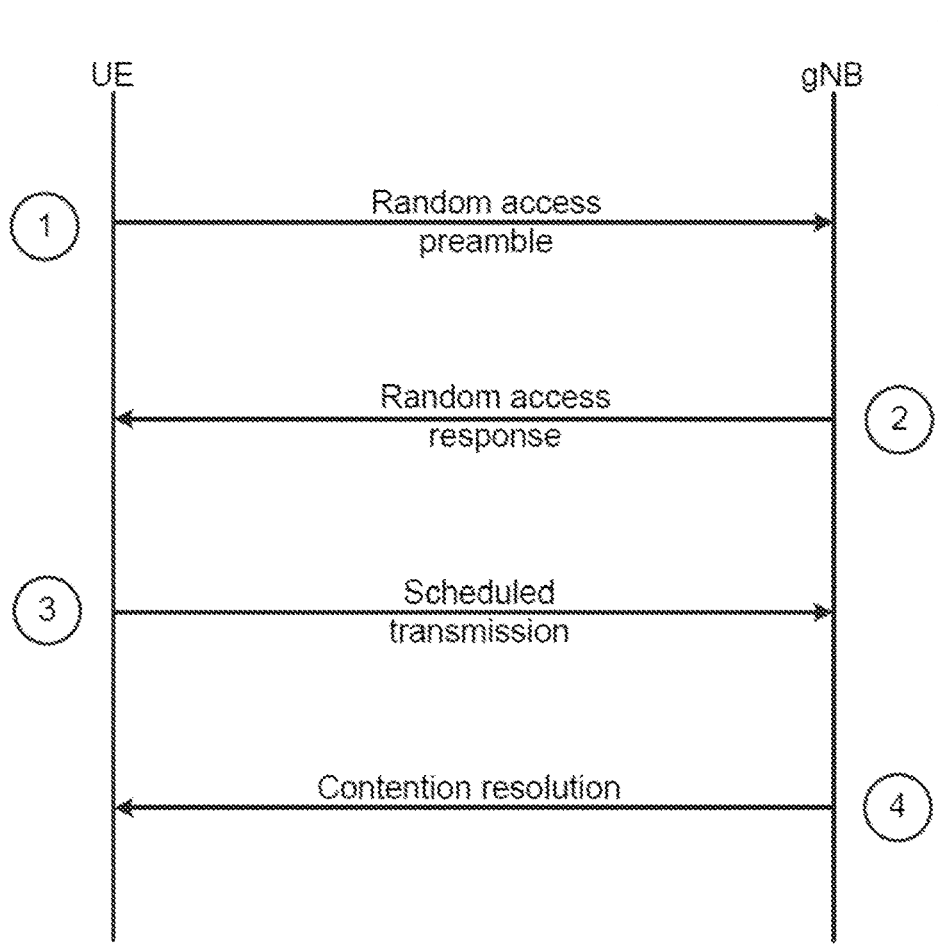
FIG. 1B is a diagram illustrating a 4-step contention-based random access (RACH) procedure according to an example implementation.

FIG. 1B is a diagram illustrating an example illustrating a 4-step contention-based random access (RACH) procedure 100 according to an example implementation. Each of the steps involves the transmission of a message ("Msg1," "Msg2," "Msg3," "Msg4") between a UE and a gNB. As shown in FIG. 1B, Msg1 includes a preamble (physical RACH, or PRACH) sent from the UE to the gNB to initiate access to the cell associated with the gNB. Msg2 includes a random access response (RAR) sent from the gNB to the UE which instructs the UE to transmit data according to a schedule. Msg3 includes the payload (data) transmitted from the UE to the gNB according to the schedule. Msg4 includes output of a contention resolution procedure according to which either acknowledges the data sent or requests that the data be re-transmitted because of, e.g., a decoding error.

The above-described 4-step RACH has some latency, and increased signaling overhead due to the multiple signaling exchanges. One solution to such latency is a 2-step RACH procedure. Such a procedure is discussed with regard to FIG. 1C.

Figure 1C:
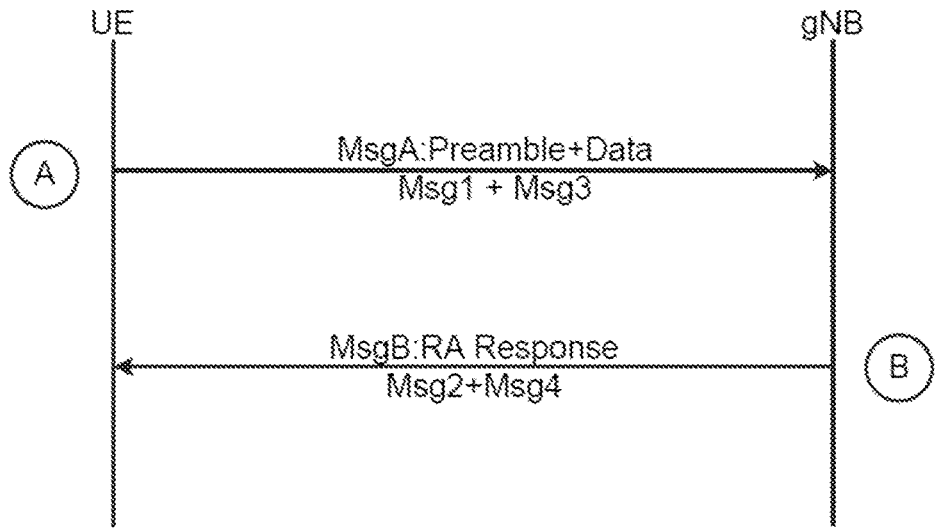
FIG. 1C is a diagram illustrating a 2-step RACH procedure according to an example implementation.

FIG. 1C is a diagram illustrating a 2-step RACH procedure 110 according to an example implementation. In the 2-step RACH procedure 110 illustrated in FIG. 1C, MsgA combines the preamble signal (Msg1) and the data signal (Msg3), and MsgB combines the random access response (Msg2) and the contention resolution (Msg4).

Nevertheless, there are no detailed proposals for the structure of the UE-to-gNB message of 2-step RACH. For example, it has been proposed that the PRACH preamble and PUSCH in MsgA be time-division multiplexed (TDMed). An example implementation has a PRACH occasion followed by a PUSCH allocation for the data part of MsgA. This, however, leads to all data of all the preambles being mapped onto the same PSUCH allocation and increases the probability of data collision and false decoding.

In contrast to the above-described conventional RACH procedures, an improved technique includes a framework for a 2-step RACH in which a first message (MsgA) from the UE to the gNB has data carrying resources (i.e., PUSCH) is organized into a time-frequency array defined by a mapping to a plurality of preambles. Such a 2-step RACH has less latency than the 4-step RACH due to fewer signaling exchanges. Moreover, this 2-step RACH also causes the UE to use less power due to a decreased signaling overhead.

Figure 2:
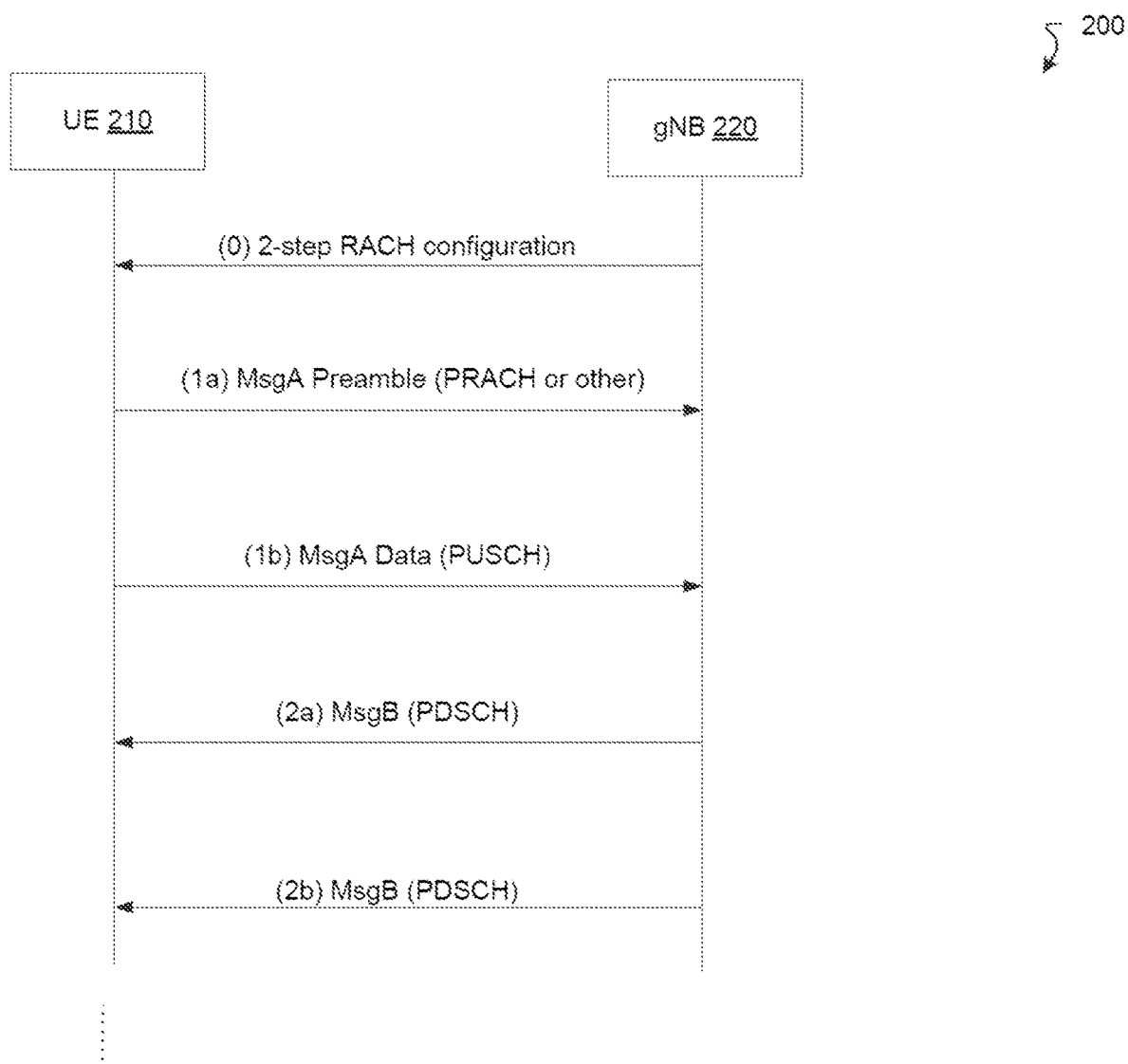
FIG. 2 is a diagram illustrating a 2-step RACH procedure with fallback according to an example implementation.

FIG. 2 is a diagram illustrating a 2-step RACH procedure 200 with fallback according to an example implementation. As shown in FIG. 2, however, there is a preliminary step 0, which involves a broadcast signal from the network (e.g., core network 150 in FIG. 1). The network broadcasts a 2-step RACH configuration in the remaining minimum system information (RMSI), system information block 1 (SIB1), as the 2-step RACH is an initial access scheme. The 2-step RACH configuration includes a set of preambles and a mapping between the preambles and a schedule by which a UE 210 may send data to a gNB 220. Further details about the mapping are described with regard to FIGS. 3-5.

As shown in FIG. 2, the MsgA generation and transmission by the UE 210 is divided into two pieces, 1a in which the preamble is selected, and 1b in which a physical resource for sending data is selected.

In 1a, in some implementations, the preamble is a Zadoff-Chu (ZC) sequence and is transmitted over the PRACH (e.g. the 2-step procedure preambles are a subset of the available PRACH preambles or there are random access opportunities (PRACH opportunities) fully dedicated to the 2-step procedure). In some implementations, the preamble has another structure other than the one used in the PRACH, but that is used both for activity detection (for the gNB 220 to detect that a transmission is occurring) and as a reference symbol for the data transmission (for the gNB 220 to estimate the channel so that it can decode the data part of MsgA).

In 1b, the UE 210 selects a physical uplink shared channel (PUSCH) resource according with the configuration broadcast by the network in step 0 and according with the UE's 210 own payload requirements. Further details with regard to 1b are described in detail with regard to FIGS. 6-10.

In 2a, the gNB 220, upon successfully decoding the Msg A, transmits a MsgB in order to acknowledge MsgA reception, perform contention resolution and potentially provide any other information that is associated with the request in Msg A. In 2b, the gNB 220 does not successfully decode the data payload of MsgA. In this case, a Msg2 (see FIG. 1B) is transmitted instead that directs the UE 210 towards a fall back 4-step procedure.

Figure 3:
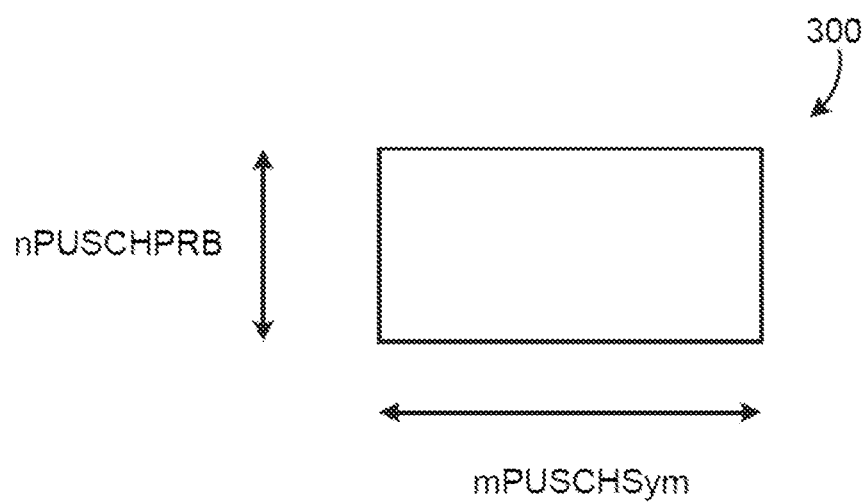
FIG. 3 is a diagram illustrating a data part of a MsgA (i.e., a message from the UE to the gNB) according to an example implementation.

FIG. 3 is a diagram illustrating a data part 300 of a MsgA (i.e., a message from the UE 210 to the gNB 220) according to an example implementation. In some implementations, as described herein, the preamble is transmitted in a PRACH Occasion (RO). In some implementations, another approach for the preamble construction is followed. In some implementations, a RO can be dedicated for a 2-Step RACH. In some implementations, the RO is shared with 4-Step RACH.

In the configuration sent by the gNB 220 in step 0, there are MAXPreambleIndex preambles. Each of the MAXPreambleIndex preambles of the configuration may be represented by a respective preamble index i. Data representing the preamble index i is transmitted by the gNB 220 in a RO, where $0 \leq i < \text{MAXPreambleIndex}$. As is discussed with regard to step 1b, the preamble index i determines the time, frequency and DMRS port of the PUSCH resources used for data transmission.

In a time-frequency grid in time and frequency space, multiple resources can be used for data transmission according to the preamble index. Each resource in the time-frequency grid has a time duration of mPUSCHSym, and an extent in the frequency domain of nPUSCHPRB as shown in FIG. 3. The symbol duration and PRB size is given by numerology of the PUSCH used for data transmission.

Figure 4:
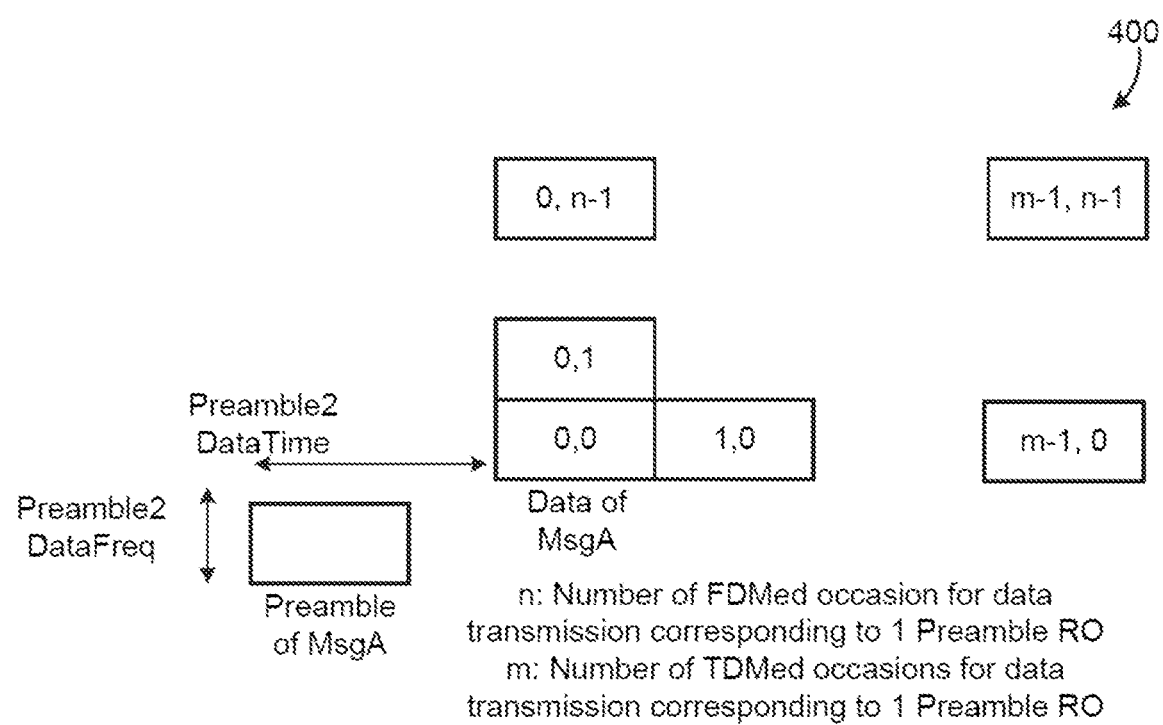
FIG. 4 is a diagram illustrating a structure of the MsgA according to an example implementation.

FIG. 4 is a diagram illustrating a structure 400 of the MsgA according to an example implementation.

As shown in FIG. 4, The MsgA PUSCH frequency resource $k_{PUSCH} \in \{0, 1, \ldots, n-1\}$, where n is the number of frequency-division multiplexed (FDMed) occasions for data transmission corresponding to one preamble RO. The MsgA PUSCH time resource $l_{PUSCH} \in \{0, 1, \ldots m-1\}$, where m is the number of TDMed occasions for data transmission corresponding to one preamble RO. The PUSCH resources are consecutive in frequency, in time the PUSCH can be consecutive, or can have a one symbol gap to accommodate a round-trip delay larger than the cyclic prefix (CP) and avoid interfering with the subsequent transmission. In the structure 400, the earliest PUSCH resource at the lowest frequency starts Preamble2DataTime symbols/slots from the start of the RO used for preamble transmission in the time domain, This PUSCH resource also starts Preamble2DataFreq physical resource blocks (PRBs) from the start of the RO used for preamble transmission in the frequency domain. Preamble2DataTime and Preamble2DataFreq are given by numerology of the PUSCH used for data transmission.

The allocation of PUSCH time and frequency resources to the $i^{th}$ preamble is performed as follows. Let A=⌈MAXPreambleIndex mod(m·n)⌉, B=⌈MAXPreambleIndex/(m·n)⌉, and C=⌊MAXPreambleIndex/(m·n)⌋. Further define $$a = \begin{cases} \left\lfloor \frac{i}{B} \right\rfloor, & i < A \cdot B \\ \left\lfloor \frac{i-A}{C} \right\rfloor, & i \geq A \cdot B \end{cases}.$$

Then the time domain resource index is $$l_{PUSCH} = \left\lfloor \frac{a}{n} \right\rfloor,$$

and the frequency domain resource index is $$k_{PUSCH} = a \bmod n.$$

FIG. 5 illustrates a table 500 illustrating an allocation of preamble index "i" to time "l" frequency "k" resources according to an example implementation. As illustrated in FIG. 5, the table is generated using the following values: MAXPreambleIndex=64, m=2, n=5.

As can be seen in FIG. 5, there may be more than one preamble that is mapped to a PUSCH time and frequency resource. Each such preamble for a particular PUSCH time and frequency resource may be assigned to a demodulation reference signal (DMRS) port of the PUSCH time and frequency resource as follows.

Let there be nPreamble values that are allocated to a PUSCH time and frequency resource such that the logical preamble index allocated to that PUSCH resource is given by h∈{0,1, . . . nPreamble−1}. Moreover, let the PUSCH time and frequency resource have nDMRSPorts DMRS ports, where the DMRS port index j∈{0,1, . . . nDMRSPorts−1}. Then the preamble index h is allocated to the DMRS port index j as follows. Let D=nPreamble mod nDMRSPorts, E=⌈nPreamble/nDMRSPorts⌉, and F=⌊nPreamble/nDMRSPorts⌋. Then $$j = \begin{cases} \left\lfloor \frac{h}{E} \right\rfloor & \text{if } i < D \cdot E \\ \left\lfloor \frac{h-D}{F} \right\rfloor & \text{Otherwise} \end{cases}.$$

The proposed mapping (including other mappings following the same principles) as well as the RO dedicated for the 2-step are shared with the UE at step 0 via that broadcasted RMSI (SIB1).

Now that the mapping of a preamble to a PUSCH time and frequency resource has been defined, the PUSCH resource selection based on the UE payload is described herein. Note that there are multiple trigger causes for 2-step RACH. Each trigger can have a different size for MsgA. Even for the same trigger, MsgA can have different size for different scenarios. Different MsgA configurations may have different number of PRBs nPUSCHPRB and number of OFDM symbols nPUSCHSym. Accordingly, there are different approaches to selecting a PUSCH resource; such approaches are discussed with regard to FIGS. 6-10.

Figure 6:
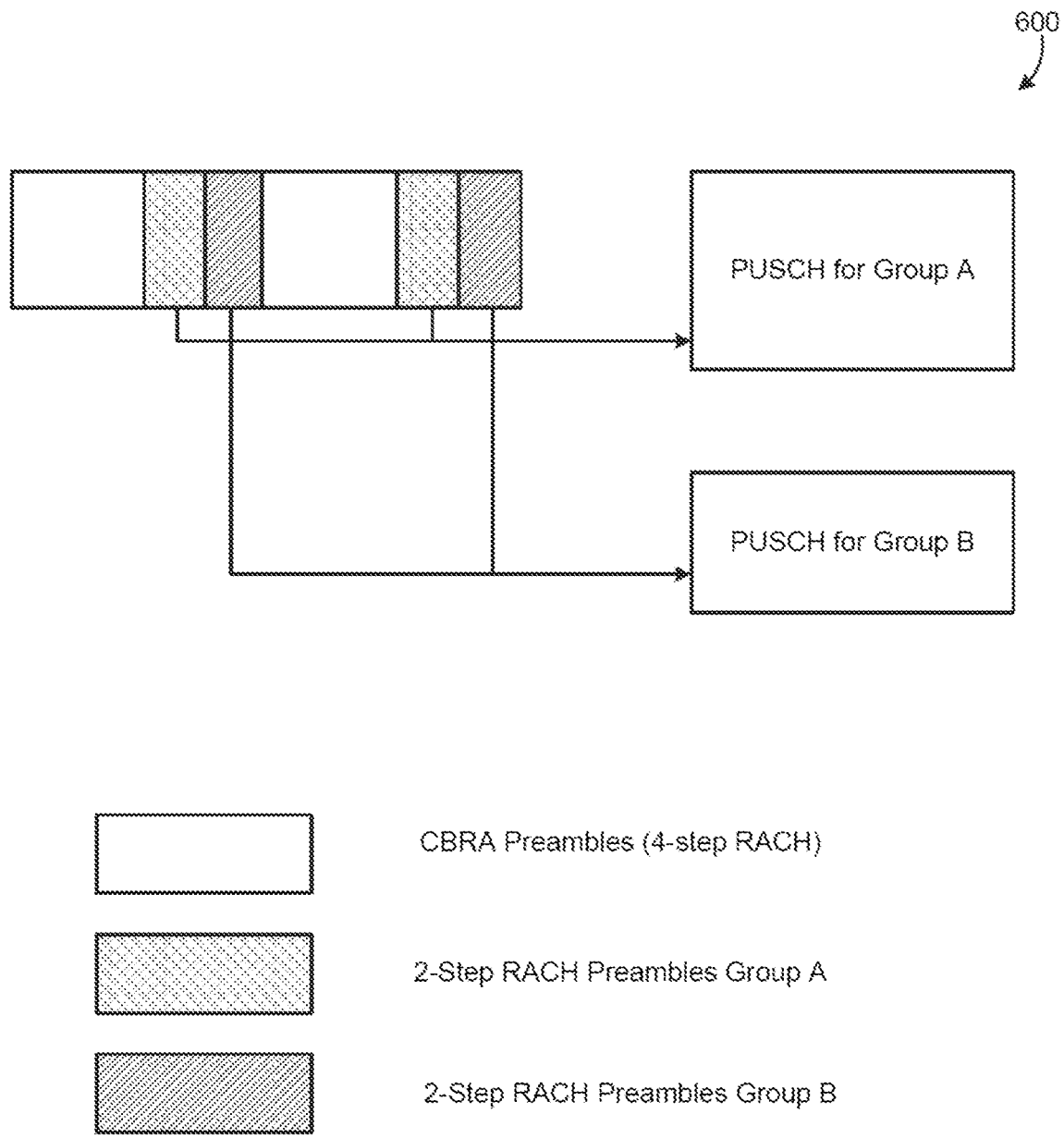
FIG. 6 is a diagram illustrating a 2-step RACH with multiple PUSCH configurations according to an example implementation.

FIG. 6 is a diagram illustrating a 2-step RACH 600 with multiple PUSCH configurations according to an example implementation. As shown in FIG. 6, the PRACH preambles are partitioned into different groups according to the msgA size. These preambles may have a direct mapping to a PUSCH block with an adequate number of resources. The preambles of the different groups can be in the same RO, or in different ROs. FIG. 6 shows a 2-step RACH 600 with two configurations, Group A and Group B. The preambles of the 2-step RACH share the same PRACH occasion with 4-Step CBRA preambles. Each MsgA configuration is a different PUSCH configuration.

In some implementations, the more often occurring triggers would have a reduced contention space, i.e. they would have a higher level of collisions.

Figure 7:
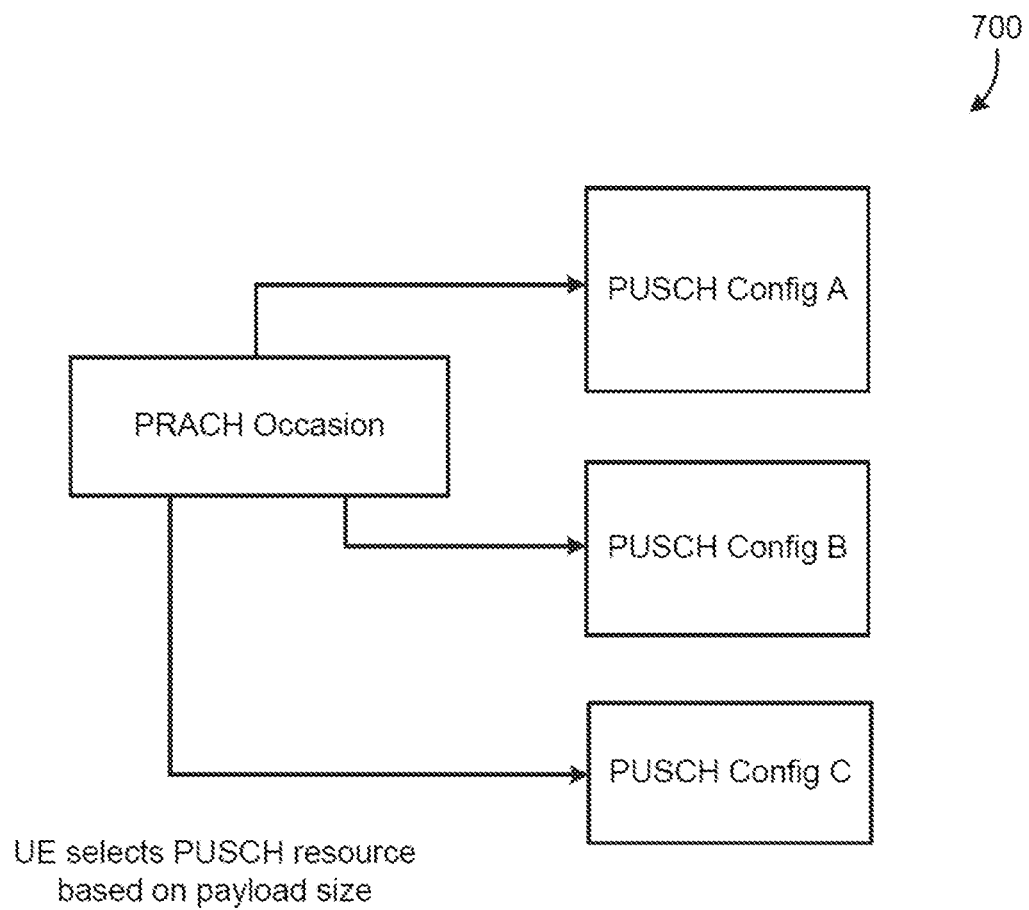
FIG. 7 is a diagram illustrating a 2-step RACH with common preamble set and different PUSCH configurations according to an example implementation.

FIG. 7 is a diagram illustrating a 2-step RACH 700 with common preamble set and different PUSCH configurations according to an example implementation. As shown in FIG. 7, the PRACH preambles are not partitioned. Nevertheless, after selecting a preamble, the UE selects a PUSCH block with an adequate number of resources from the pool of available blocks. In some implementations, each preamble is associated with multiple PUSCH blocks and each PUSCH block has a different resource allocation size. The UE selects the PUSCH block based on the amount of resources it needs. The gNB tries different hypotheses to determine which PUSCH the UE has sent.

FIG. 7 shows an example with a PRACH occasion that is not partitioned. Each preamble index in the PRACH occasion is associated with a PUSCH resource in each of the three PUSCH configuration areas shown in FIG. 7. Each PUSCH configuration is similar to the MsgA data part of FIG. 7.

In the approach illustrated in FIG. 7, there is a more complex decoding as there would not be a direct mapping between PRACH preamble and PUSCH resource. This approach either increases the probability of collision for the same PUSCH resource usage or increases the PUSCH resource usage.

Another approach involves having a single PUSCH resource allocation size. Smaller payloads are then padded or rate-matched to fit within a single PUSCH resource allocation size.

Yet another approach involves performing a resource partitioning by creating a set of "data carrying candidates", as shown in FIG. 5. In some implementations, the configuration will divide the resources into clusters of resources that allows for the UE to transmit the uplink data (PUSCH) for the random access message payload. This approach is discussed in detail with regard to FIGS. 8A and 8B.

Figure 8A:
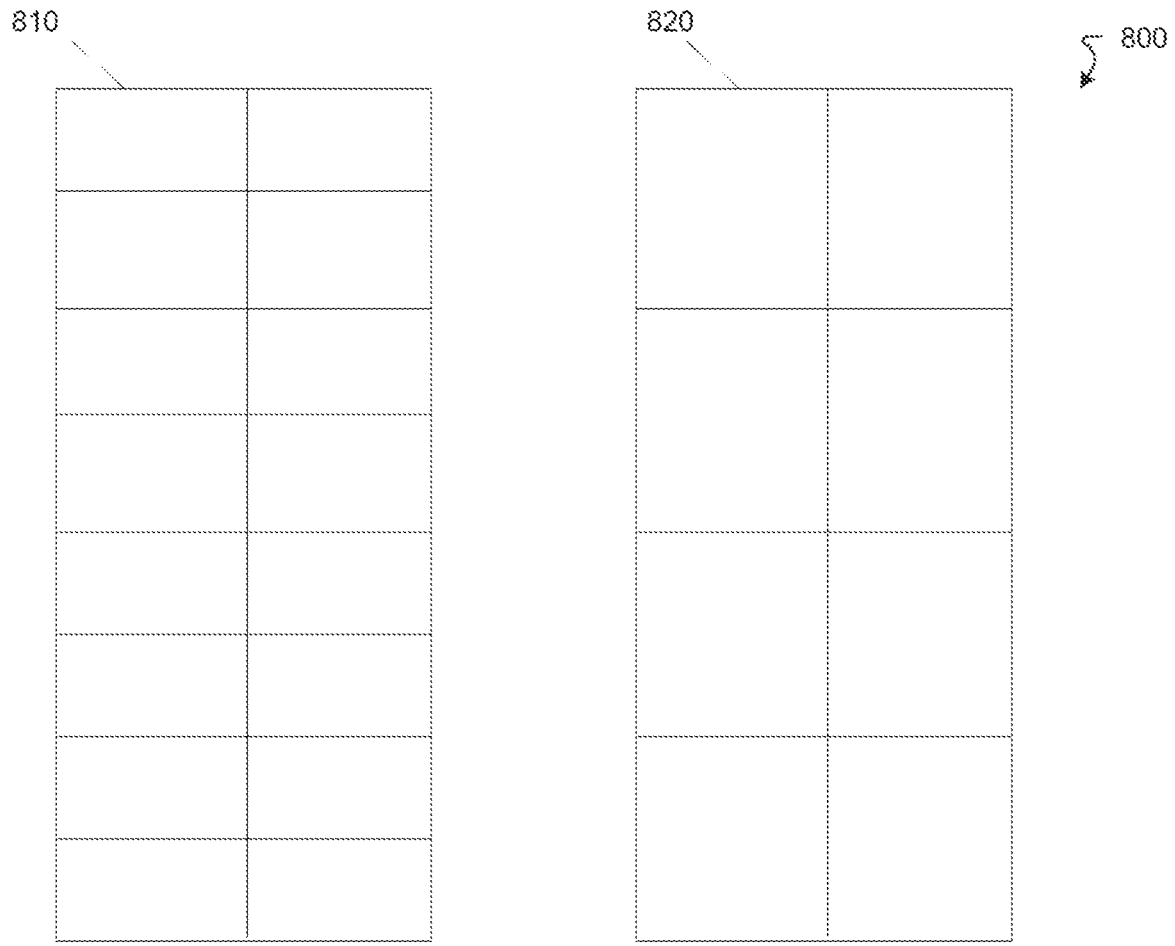
FIG. 8A is a diagram illustrating orthogonal resources for different payload sizes of MsgA according to an example implementation.

FIG. 8A is a diagram illustrating orthogonal resources 800 for different payload sizes of MsgA according to an example implementation. FIG. 8A shows that the resources are divided into two sets 810 and 820, each set being able to carry two different payload sizes. As shown in the FIG. 8A, the first X messages are pre-assigned to the smaller payloads, while the larger payloads (assuming up to Y messages) are reserved some other physical resources. By knowing the physical resources assigned to the message, as well as the amount of messages for X and Y (and payload size difference or ratio between X and Y), it is possible to generate a proper mapping between the payload sizes and the resources. An example of this approach is discussed with regard to FIG. 8B.

Figure 8B:
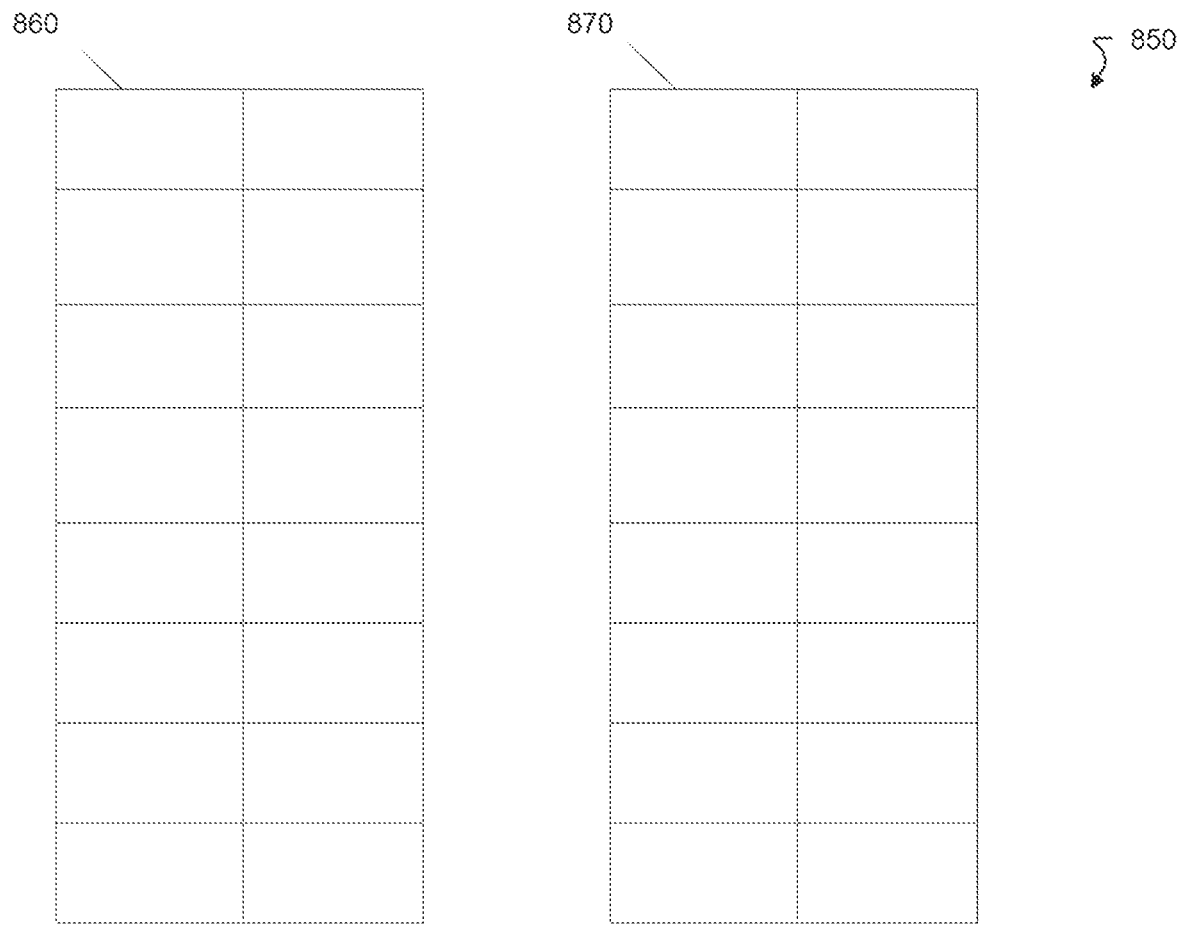
FIG. 8B is a diagram illustrating overlaid resources for different payload sizes of MsgA according to an example implementation.

FIG. 8B is a diagram illustrating overlaid resources 860 and 870 for different payload sizes of MsgA according to an example implementation. In FIG. 8B, the UE is allowed to create new "virtual" resources in the physical resources normally reserved for the larger payloads to carry messages with low payload. Allowance of using such resources on a temporary basis could potentially be triggered by network signaling via the RMSI (SIB1) in step 0.

In some implementations, the data carrying candidates are organized in an array of basic units as shown in FIG. 4. The basic unit is the smallest resource allocation size of MsgA data. When transmitting the data part of MsgA, the UE allocates one or more basic units depending on the configuration of MsgA and the amount of resources needed to transmit the MsgA payload. There preamble index is associated with the selected PUSCH resource. There are two alternatives in this scenario, discussed in further detail with regard to FIGS. 9 and 10, respectively.

Figure 9:
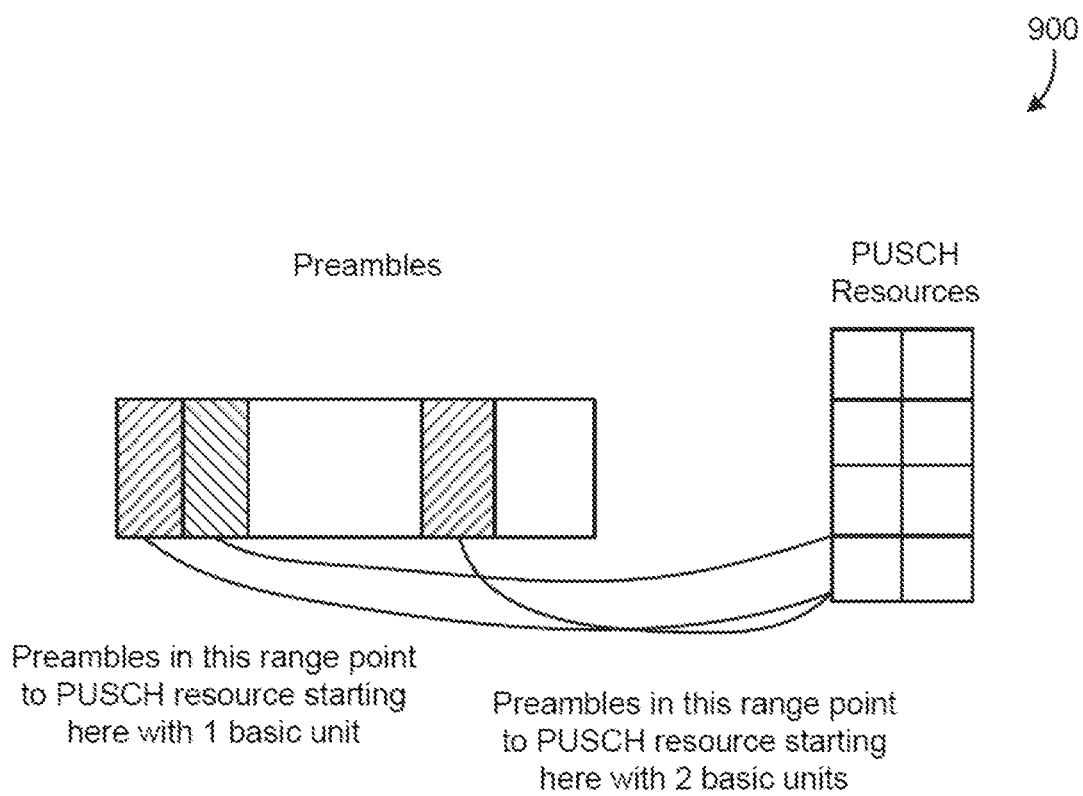
FIG. 9 is a diagram illustrating a PUSCH resource allocation in basic units with preamble indicating PUSCH starting location and size according to an example implementation.

FIG. 9 is a diagram illustrating a PUSCH resource allocation 900 in basic units with preamble indicating PUSCH starting location and size according to an example implementation. That is, the preamble index indicates the starting position (in time and frequency) of the PUSCH resource as well as the PUSCH resource allocation size (in number of basic units). FIG. 9 shows an example where the PUSCH resource can have a size of one or two basic units, and preamble index indicate the PUSCH resource starting position in time and frequency, as well as the PUSCH resource size. This alternative reduces the gNB receiver complexity, as it avoids decoding multiple hypotheses.

As an example, consider eight basic resource allocations for MsgA as shown in FIG. 8. These are denoted by A, B, C, D, E, F, G, H. In this example, the network configures the following possible allocations eight single basic resource allocation: A, B, C, D, E, F, G, H, and 4 double resource allocation: AB, CD, EF, GH. In total, there are twelve possible allocations that can be signalled by the preamble. The preamble space, in this example is divided into twelve sets. When a preamble is selected from a set, it points to the PUSCH resource corresponding to that set.

Figure 10:
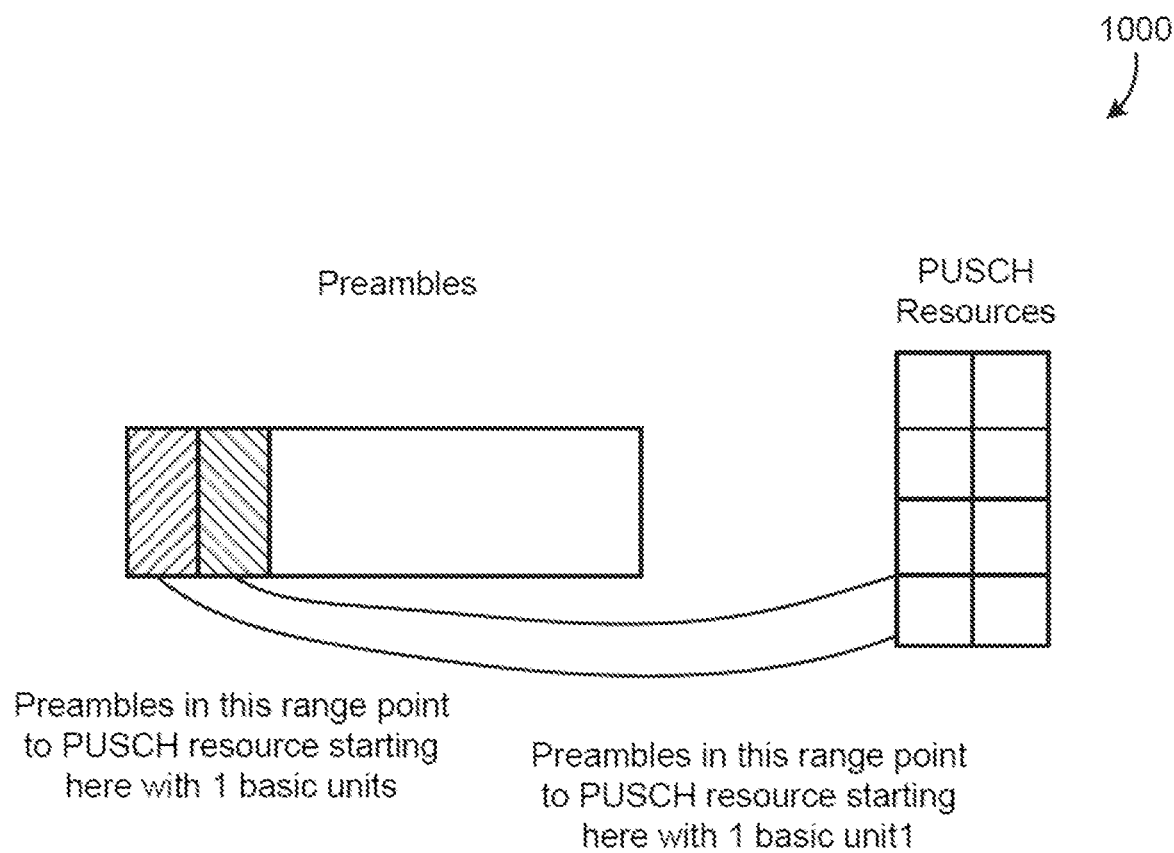
FIG. 10 is a diagram illustrating PUSCH resource allocation in basic units with preamble indicating PUSCH starting location according to an example implementation.

FIG. 10 is a diagram illustrating PUSCH resource allocation in basic units with preamble indicating PUSCH starting location according to an example implementation. That is, the preamble index indicates the starting position (in time and frequency). The UE selects PUSCH resource size based on the amount of data and MCS it needs to transmit. The gNB tries multiple decoding hypotheses to find the PUSCH resource size sent by the UE.

As an example, consider eight basic resource allocations for MsgA as shown in FIG. 10. These are denoted by A, B, C, D, E, F, G, H. In this example, the network configures the following possible allocations eight single basic resource allocation: A, B, C, D, E, F, G, H, and 4 double resource allocation: AB, CD, EF, GH. In total, there are twelve possible allocations, however, there are only eight possible starting positions. The preamble space, in this example is divided into eight sets corresponding to the starting positions. When a preamble is selected from a set, it points to the PUSCH resource starting position corresponding to that set.

If a preamble points to a starting position with two possible resource allocations (e.g. A and AB), the network decodes multiple hypotheses to determine the PUSCH resource allocation the UE used to transmit the data part of MsgA.

Figure 11:
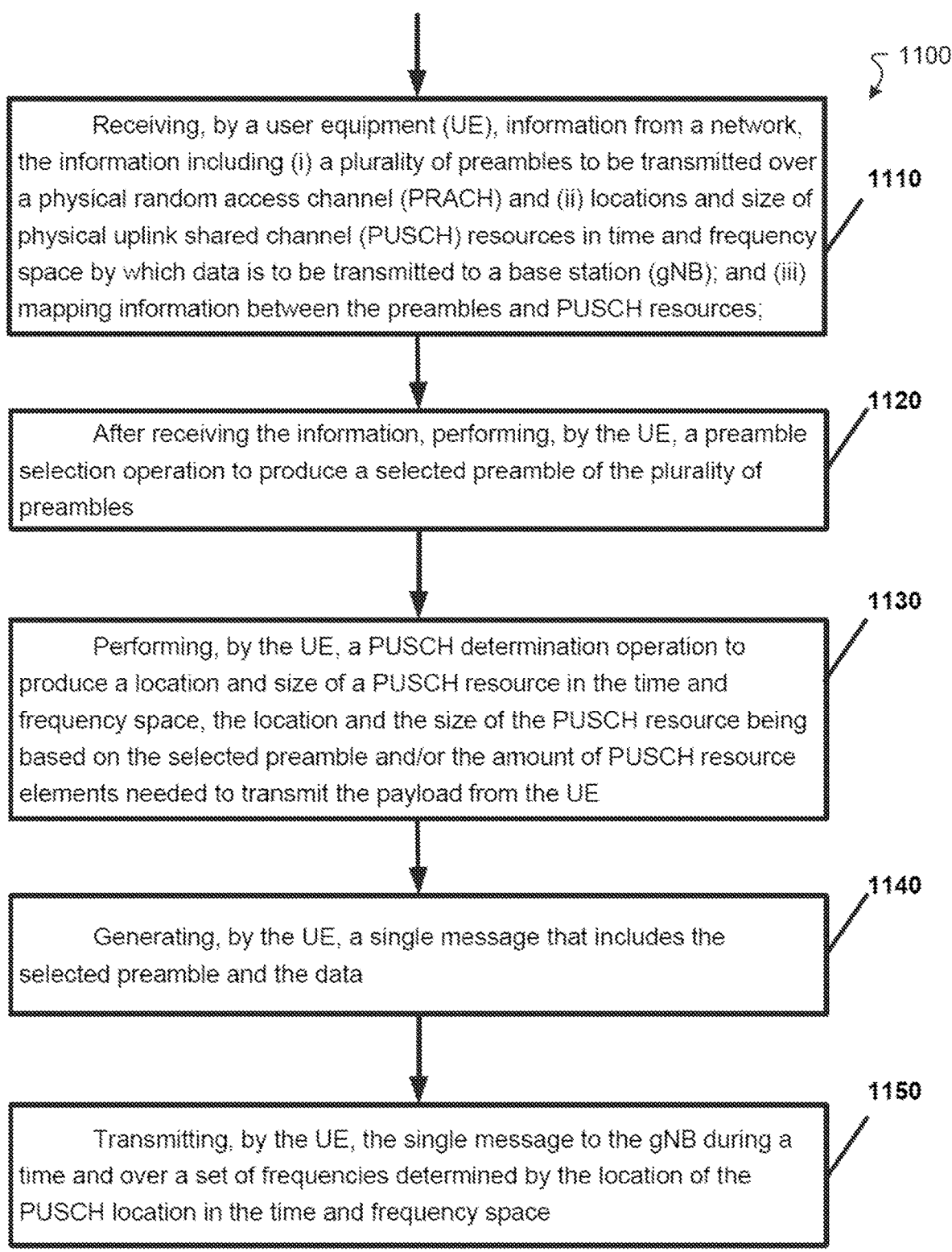
FIG. 11 is a flow chart illustrating a method of performing a 2-step RACH procedure according to an example implementation.

Example 1: FIG. 11 is a flow chart illustrating an example method 1100 of performing the improved techniques. Operation 1110 includes receiving, by a user equipment (UE), information from a network, the information including (i) a plurality of preambles to be transmitted over a physical random access channel (PRACH) and (ii) locations and size of physical uplink shared channel (PUSCH) resources in time and frequency space by which data is to be transmitted to a base station (gNB); and (iii) mapping information between the preambles and PUSCH resources. Operation 1120 includes, after receiving the information, performing, by the UE, a preamble selection operation to produce a selected preamble of the plurality of preambles. Operation 1130 includes performing, by the UE, a PUSCH determination operation to produce a location and size of a PUSCH resource in the time and frequency space, the location and the size of the PUSCH resource being based on the selected preamble and/or the amount of PUSCH resource elements needed to transmit the payload from the UE. Operation 1140 includes generating, by the UE, a single message that includes the selected preamble and the data. Operation 1150 includes transmitting, by the UE, the single message to the gNB during a time and over a set of frequencies determined by the location of the PUSCH location in the time and frequency space.

Example 2: According to an example implementation of example 1, wherein each of the plurality of preambles is represented by a respective preamble index, wherein each of the locations of the PUSCH resources is represented by a time index and a frequency index, the time index indicating the time, the frequency index indicating a frequency of the set of frequencies, and wherein performing the PUSCH selection operation includes finding a physical resource block (PRB) of a plurality of PRBs having a frequency index and an orthogonal frequency division multiplex (OFDM) symbol having a time index produced by a mapping operation based on the preamble index.

Example 3: According to an example implementation of example 2, wherein finding the PRB having the time index and frequency index produced by the mapping operation includes generating a preamble multiplier, the preamble multiplier being based on a ratio of a number of preambles of the plurality of preambles to a number of PRBs of the plurality of PRBs.

Example 4: According to an example implementation of example 3, wherein finding the PRB having the time index and frequency index produced by the mapping operation further includes generating a ratio of the preamble index to the preamble multiplier to produce a coefficient, the time index and the frequency index being based on a ratio of the coefficient to a number of PRBs in frequency space.

Example 5: According to an example implementation of example 2, wherein each of the PUSCH resources has a set of demodulation reference signal (DMRS) ports, and wherein the method further comprises locating, within the found PRB and OFDM symbol, a DMRS port corresponding to the preamble index.

Example 6: According to an example implementation of example 5, wherein locating the DMRS port within the found PRB includes generating a preamble ratio, the preamble ratio being a ratio of a number of preambles corresponding to the found PRB(s) and OFDM symbol(s) and a number of DMRS ports of the found PRB.

Example 7: According to an example implementation of example 6, wherein locating the DMRS port within the found PRB further includes generating a ratio of a local preamble index to the preamble ratio to produce a DMRS port index, the local preamble index indicating the preamble within the found PRB.

Example 8: According to an example implementation of example 1, wherein data defining the preamble and the PUSCH resources are arranged on a resource grid, the resource grid having (i) a plurality of slots corresponding to the time and (ii) physical resource blocks (PRBs) associated with a respective subcarrier of a respective plurality of subcarriers corresponding to each of the plurality of slots.

Example 9: According to an example implementation of example 8, wherein the preamble is arranged in a first slot of the resource grid and the PUSCH resources are arranged on a second slot of the resource grid, the first slot and the second slot being adjacent.

Example 10: According to an example implementation of example 8, wherein the subcarrier spacings of the plurality of subcarriers in the first slot are the same as the subcarrier spacings of the plurality of frequency bands in the second slot.

Example 11: According to an example implementation of example 8, wherein the preamble and the PUSCH resources are arranged on the same slot of the resource grid.

Example 12: According to an example implementation of example 1, wherein each of the plurality of preambles is associated with a respective group of a plurality of groups based on a size of a payload associated with the data to be transmitted with that preamble in the single message.

Example 13: According to an example implementation of example 12, wherein each of the plurality of preambles associated with a group of the plurality of groups belong to the same random access (RACH) occurrence.

Example 14: According to an example implementation of example 12, wherein each of the plurality of preambles is signaled as a contention-free preamble.

Example 15: According to an example implementation of example 1, wherein each of the PUSCH resources has a respective payload size, and wherein performing the PUSCH selection operation includes selecting a PUSCH resource according to its payload size.

Example 16: FIG According to an example implementation of example 1, wherein each of the PUSCH resources has the same payload size.

Example 17: According to an example implementation of example 16, wherein the size of the payload associated with the data is larger than the payload size of each of the PUSCH resources, and wherein performing the PUSCH selection operation includes selecting multiple PUSCH resources by which the data is to be transmitted to the gNB.

Example 18: According to an example implementation of example 16, wherein the preamble indicates a starting position in the time and frequency space of the selected PUSCH resource.

Example 19: According to an example implementation of example 18, wherein the preamble further indicates the payload size of the selected PUSCH resource.

Example 20: According to an example implementation of example 1, wherein the method further comprises, after transmitting the single message to the gNB, receiving, from the gNB, a message indicating that the data was not successfully decoded and that a 4-step RACH procedure is to be used to transmit the data to the gNB.

Example 21: An apparatus comprising means for performing a method of any of examples 1-20.

Example 22: A computer program product including a non-transitory computer-readable storage medium and storing executable code that, when executed by at least one data processing apparatus, is configured to cause the at least one data processing apparatus to perform a method of any of claims 1-20.

2-Step RACH to a Fallback 4-Step RACH Procedure

Figure 12:
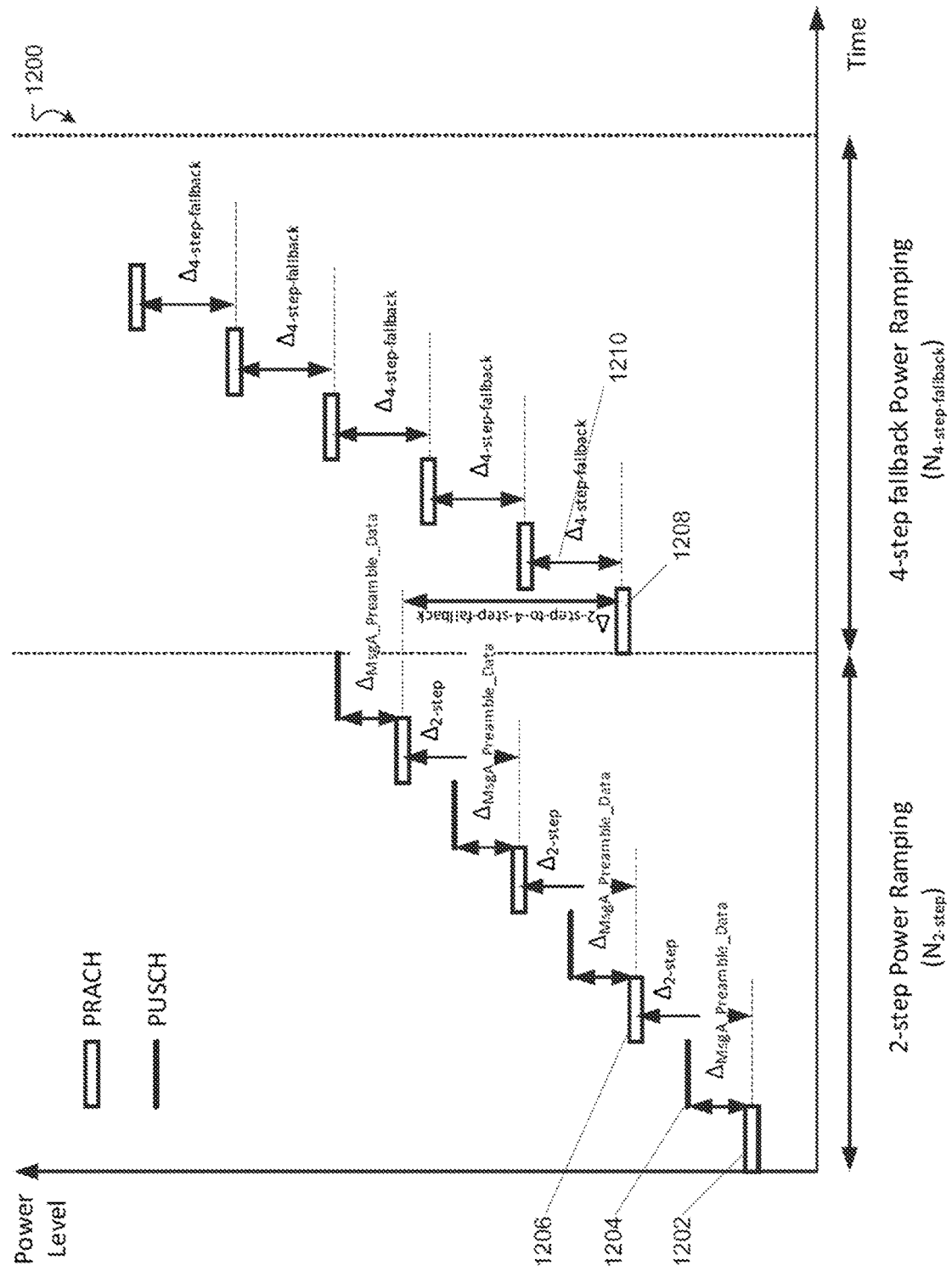
FIG. 12 is a diagram illustrating a power ramping schedule for a fallback 4-step RACH procedure from a 2-step RACH procedure according to an example implementation.

The above-described fallback to a 4-step RACH when the gNB is unable to receive or recognize the preamble sent by the UE over a PRACH opportunity (RO) is herein described in further detail with respect to FIG. 12.

Here, the fallback aspects associated with the power ramping procedure are addressed. More specifically, a set of control mechanisms allows for a gNB to adjust thresholds for controlling the UE transfer from a 2-step RACH procedure to a 4-step RACH procedure while still maintaining a proper setting for transmit power during this transition. The mechanism will allow for a UE to have a smooth transition to the 4-step procedure instead of having to start the power ramping from scratch when transferring to the fall-back routine.

FIG. 12 is a diagram illustrating a power ramping schedule 1200 for a fallback 4-step RACH procedure from a 2-step RACH procedure according to an example implementation. The power ramping schedule 1200 includes a power ramping schedule 1202-1206 for a 2-step RACH procedure and a power ramping schedule 1208-1210 for a fallback 4-step RACH procedure.

A UE receives configuration parameters for the 2-step RACH procedure from a serving gNB. These configuration parameters include information including the power ramping schedule 1200. In some implementations, this information is provided in system broadcast signalling. In some implementations, the information includes UE or beam dedicated information.

In some implementations, the configuration parameters include an initial allowed two-step power $P_{2\text{-}step\text{-}initial}$ or parameters related to set an initial transmit power for the 2-step RACH procedure through an open loop algorithm.

In some implementations, the configuration parameters include a number of allowed 2-step power ramping attempts $N_{2\text{-}step\text{-}power}$ or retransmission attempts $N_{2\text{-}step\ before}$ fall back is triggered.

In some implementations, the configuration parameters include a number of allowed 4-step fall back power ramping attempts or 4-step fall back retransmission attempts $N_{4\text{-}step\text{-}fallback}$ and preamble $\text{TransMax}_{fallback}$.

In some implementations, the configuration parameters include a power ramping increase between 2-step power ramping attempts on the same beam $\Delta_{2\text{-}step}$.

In some implementations, the configuration parameters include a power ramping increase between 4-step fall back power ramping attempts on the same beam $\neq_{4\text{-}step\text{-}fallback}$.

In some implementations, the configuration parameters include a starting power of the 4-step fall back power ramping. In some implementations, the same beam for 4-step RACH fallback is used as the beam used for the last 2-step RACH transmission. In some implementations, the starting power of the 4-step fall back power ramping is based on the offset between the last used 2-step power step $\Delta_{2\text{-}step\text{-}to\text{-}4\text{-}step\text{-}fallback}$ specified in the configuration parameters. In some implementations, the specific initial power step is similar to the 4-step procedure $P_{4\text{-}step\text{-}fallback}$. In some implementations, the starting power of the 4-step fall back power ramping is indicated through the open loop configuration for transmit power.

In some implementations, the configuration parameters include a power offset between the 2-step RACH procedure MsgA preamble and MsgA data $\Delta_{MsgA\_Preamble\_Data}$.

The 2-step power ramping configuration shown in FIG. 12 begins with an initial attempt at sending a message to a gNB over a RO and a PUSCH occasion (PO). As described above, a UE sends message data over a PO and a preamble over a RO. The message data is sent over the PO at 1202 with the initial power $P_{2\text{-}step\text{-}initial}$. The preamble is sent over the RO at 1204 with power $P_{2\text{-}step\text{-}initial}+\Delta_{MsgA\_Preamble\_Data}$. In some implementations, the initial 2-step power set an initial transmit power for the 2-step RACH procedure through an open loop algorithm.

If the gNB is unable to decode the MsgA preamble (and consequentially is also not able to detect the MsgA data part) it does not reply to the UE with a MsgB and the UE proceeds with the power ramping procedure 1200. In this case, the UE increases the power by which it sends the message to the gNB by an amount $\Delta_{2\text{-}step}$. The power used to send the message data over the PO at 1206 is then $P_{2\text{-}step\text{-}initial}+\Delta_{2\text{-}step}$ and the power used to send the preamble over the RO is $P_{2\text{-}step\text{-}initial}+\Delta_{2\text{-}step}+\Delta_{MsgA\_Preamble\_Data}$.

In some implementations, the gNB is able to decode the MsgA preamble and the MsgA data; the gNB then proceeds with the 2-step procedure, i.e. a MsgB is eventually sent to the UE. In some implementations, the gNB is able to decode the MsgA preamble but not the MsgA data; the UE can then either reattempt the power ramping procedure or the gNB can allocate dynamically a new PUSCH resource for the UE's MsgA transmission.

In case the number of 2-step retransmission attempts doesn't exceed $N_{2\text{-}step}$ and the number of 2-step power ramping attempts does not exceed $N_{2\text{-}step\_power}$, then the UE performs a new MsgA preamble transmission with the previous power $P_{2\text{-}step\text{-}previous}+\Delta_{2\text{-}step}$ and a MsgA data transmission with power $P_{2\text{-}step\text{-}previous}+\Delta_{2\text{-}step}+\Delta_{MsgA\_Preamble\_Data}$ when using the same beam. If using a different beam there is no change in power or the next preamble transmission power is reset to the $P_{2\text{-}step\text{-}initial}$. In some implementations, is using a different beam there is an increase of the preamble transmission power by $P_{2\text{-}step\text{-}previous}+\Delta_{2\text{-}step}$.

This process repeats until a specified terminal point at which the 2-step RACH procedure falls back to a 4-step RACH procedure. In some implementations, the specified terminal point is a number of allowed 2-step power ramping attempts $N_{2\text{-}step\_power}$ or retransmission attempts $N_{2\text{-}step}$ before fallback is triggered. In some implementations, the specified terminal point is a maximum power allowed for the 2-step RACH procedure.

When the specified terminal point has been reached, i.e., the RACH process transitions from the 2-step RACH procedure to the 4-step RACH procedure, the UE adjusts the power to an initial 4-step power $P_{4\text{-}step\text{-}fallback}$. In some implementations, the initial 4-step power is specified in the information received by the UE. In some implementations, the initial 4-step power is determined from a power offset $\Delta_{2\text{-}step\text{-}to\text{-}4\text{-}step\text{-}fallback}$ specified in that information.

The UE performs the initial 4-step fallback attempt with either $P_{4\text{-}step\text{-}fallback}$ or $P_{2\text{-}step\text{-}previous}+\Delta_{2\text{-}step\text{-}to\text{-}4\text{-}step\text{-}fallback}$. In some implementations, the UE uses the same beam for the initial 4-step fallback transmission as the last 2-step transmission.

If the gNB is unable to decode the Msg1 preamble, the gNB does not reply to the UE with a Msg2, and the UE proceeds with power ramping procedure 1200 for the 4-step fallback. In some implementations, when the number of 4-step fallback power ramping attempts does not exceed $N_{4\text{-}step\text{-}fallback}$ and the four-step fallback retransmission attempts does not exceed $TransMax_{fallback}$, the UE performs a new Msg1 preamble transmission with power $P_{4\text{-}step\text{-}fallback\text{-}previous}+\Delta_{4\text{-}step\text{-}fallback}$, when using the same beam. In some implementations, when using a different beam there is no change in power. In some implementation, when using a different beam, the 4-step preamble transmission power is reset to $P_{4\text{-}step\text{-}fallback}$ or $P_{2\text{-}step\text{-}previous}+\Delta_{2\text{-}step\text{-}to\text{-}4\text{-}step\text{-}fallback}$. In some implementations, when using a different beam, the 4-step preamble transmission power is given by $P_{4\text{-}step\text{-}fallback\text{-}previous}+\Delta_{4\text{-}step\text{-}fallback}$.

In some implementations, when the number of 4-step fallback power ramping attempts exceeds $N_{4\text{-}step\text{-}fallback}$ or exceeds the allowed number of 4-step fallback retransmission attempts preambleTransMaxfallback, the UE stops the RACH procedure.

In some implementations, when the gNB detects the 2-step MsgA preamble but not the data and indicates to the UE to fall back to the 4-step RACH starting with the transmission of the 4-step RACH preamble, the UE transmits the 4-step RACH preamble on the same beam, and with the same power as the 2-step RACH whose MsgA preamble was received but MsgA data was not received.

In some implementations, when the gNB detects the 2-step MsgA preamble but not the data and indicates to the UE to fall back to 4-step RACH starting with the transmission of the 4-step RACH Msg3, the UE transmits Msg3 following the power control command in the MsgB, where the power control command is applied to the power of the data part of MsgA. In some implementations, there is an additional power offset that is semi-statically configured.

Figure 13:
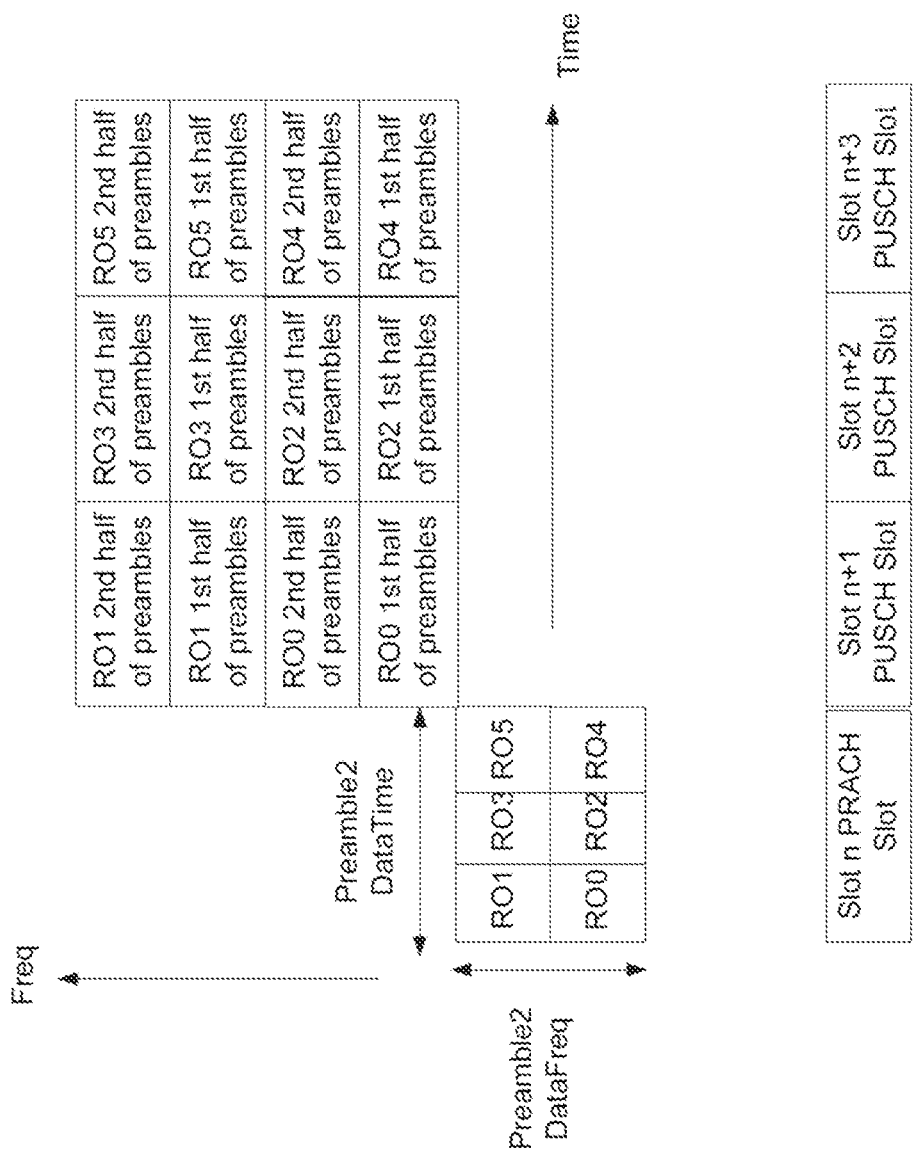
FIG. 13 is a diagram illustrating a map of PRACH opportunities to PUSCH occasions using two configured semi-static offsets, one in time and the other in frequency, according to an example implementation.

In the following discussion a 2-step RACH PUSCH resource unit is referred to as PUSCH Occasion (PO). As shown in FIG. 13, the mapping of the PRACH preambles and PRACH Occasions within a PRACH slot (or PRACH subframe/60 kHz slot in FR1/FR2) to PUSCH Occasions (i.e., basic units) starting with a PUSCH Occasion having a configured time and frequency offset from the start of the PRACH slot (or PRACH subframe/60 kHz slot in FR1/FR2) and, in frequency, from the start of the first RO in frequency is done frequency first, time second.

Within a PRACH slot, there are multiple PRACH occasions (ROs). For example, with preamble format A2, there are three time-domain ROs within a PRACH slot. If the product of the duration of the PO and the number of time-division multiplexed (TDMed) POs mapped to one RO is greater than the duration of a RO, then the offset between the start of each RO and the start of the corresponding PO is based on the location of the RO within PRACH slot favouring a different time offset for each RO for the time relation between the RO and PO. The time offset can be fixed in the specifications or configured by higher layers, the latter is preferred as it gives more flexibility to the network. Similar arguments hold in the frequency domain, when multiple ROs are FDMed in the same time-domain RO. Nevertheless, such a configuration would increase the configuration overhead, as there could be a time offset and a frequency offset for each RO within the PRACH slot.

In some implementations, to simplify the configuration of the mapping rule between ROs and POs, all 2-step RACH ROs within a PRACH slot (or within a PRACH subframe/60 kHz slot in FR1/FR2) are mapped to POs before the next occurrence of a 2-step PRACH slot (or PRACH subframe/60 kHz slot in FR1/FR2). In this case, the network can configure a time domain offset (Preamble2DataTime) between the start of the PRACH slot (or PRACH subframe/60 kHz slot in FR1/FR2) and the start of the first PUSCH Occasion that maps to the first RO within the PRACH slot (or PRACH subframe/60 kHz slot in FR1/FR2). The mapping of preamble groups within the ROs to POs happens frequency first time second. Hence, a single semi-static value is used to configure the offset between the start of the PRACH slot (or PRACH subframe/60 kHz slot in FR1/FR2) containing the 2-step RACH ROs and the start of the PUSCH Occasions. Another semi-static value is used to configure the offset, in frequency domain, between the start of the first RO in frequency and the start, in frequency, of the PUSCH Occasions.

FIG. 13 is a diagram illustrating a map 1300 of ROs to POs using two configured semi-static offsets, one in time and the other in frequency, according to an example implementation. In FIG. 13, there are 6 ROs in the PRACH slot, R0-R5. Each of these POs is mapped to two PUSCH resources according to the map. In FIG. 13, there are four frequency slots and three time slots in the PUSCH resources. Within each slot corresponding to a PO, PUSCH associated with half of the preambles corresponding to a mapped RO is configured to be sent to the gNB.

Figure 14:
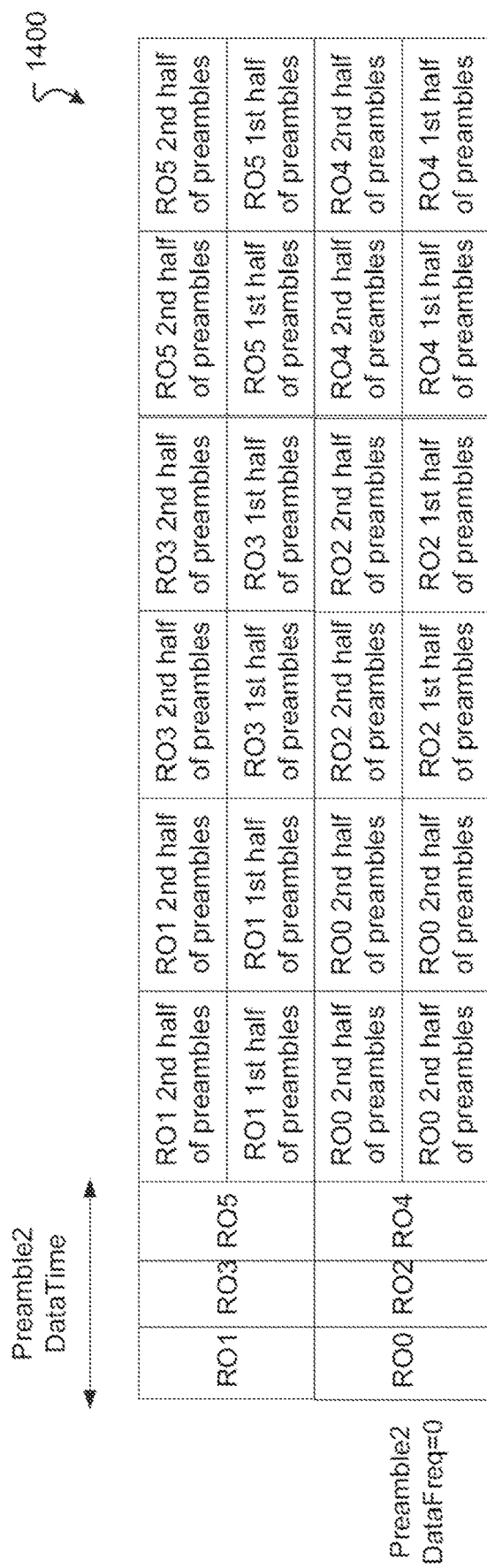
FIG. 14 is a diagram illustrating a map of PRACH opportunities to PUSCH occasions with PUSCH repetition according to an example implementation.

FIG. 14 is a diagram illustrating a map 1400 of PRACH opportunities to PUSCH occasions with PUSCH repetition according to an example implementation. As shown in FIG. 14, there is no frequency offset (i.e. frequency offset=0) and the time offset is given by the semi-static value Preamble2DataTime. In FIG. 14, there are four frequency slots and six time slots in the PUSCH resources. Within each slot corresponding to a PO, PUSCH associated with half of the preambles corresponding to a mapped RO is configured to be sent to the gNB, and each half is repeated in time.

Figure 15:
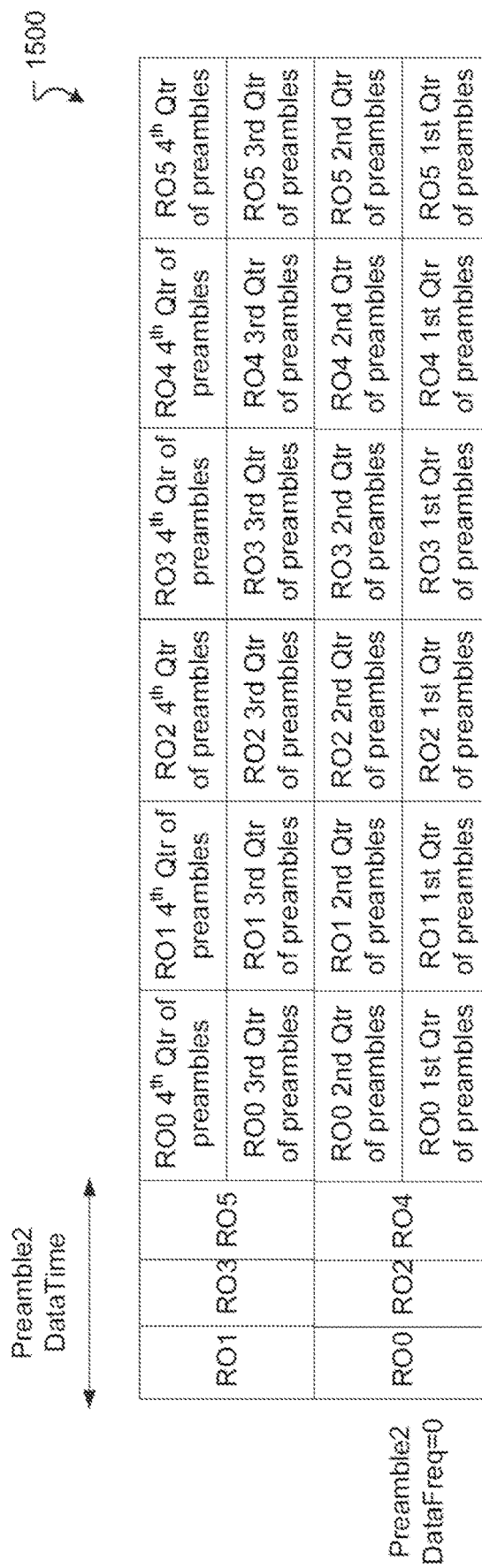
FIG. 15 is a diagram illustrating a map of PRACH opportunities to PUSCH occasions using a frequency-first, time second mapping rule with four preamble groups per PRACH opportunity according to an example implementation.

FIG. 15 is a diagram illustrating a map 1500 of PRACH opportunities to PUSCH occasions using a frequency-first, time second mapping rule with four preamble groups per RO according to an example implementation. As shown in FIG. 15, there is no frequency offset (i.e. frequency offset=0) and the time offset is given by the semi-static value Preamble2DataTime. In FIG. 15, there are four frequency slots and six time slots in the PUSCH resources. Within each slot corresponding to a PO, a PUSCH associated with a quarter of the preambles corresponding to a mapped RO is configured to be sent to the gNB, with no repetition in time.

FIG. 16 is a diagram illustrating an alternative mapping rule 1600 according to an example implementation. The alternative mapping rule shown in FIG. 16 is to have the frequency domain location of the PO based on an offset from the corresponding RO, with the offset depending on the frequency position of the RO. In the time domain, a single semi-static value is used to configure the offset between the start of the PRACH slot (or PRACH subframe/60 kHz slot in FR1/FR2) containing the 2-Step RACH ROs and the start of the PUSCH Occasions.

Figure 17:
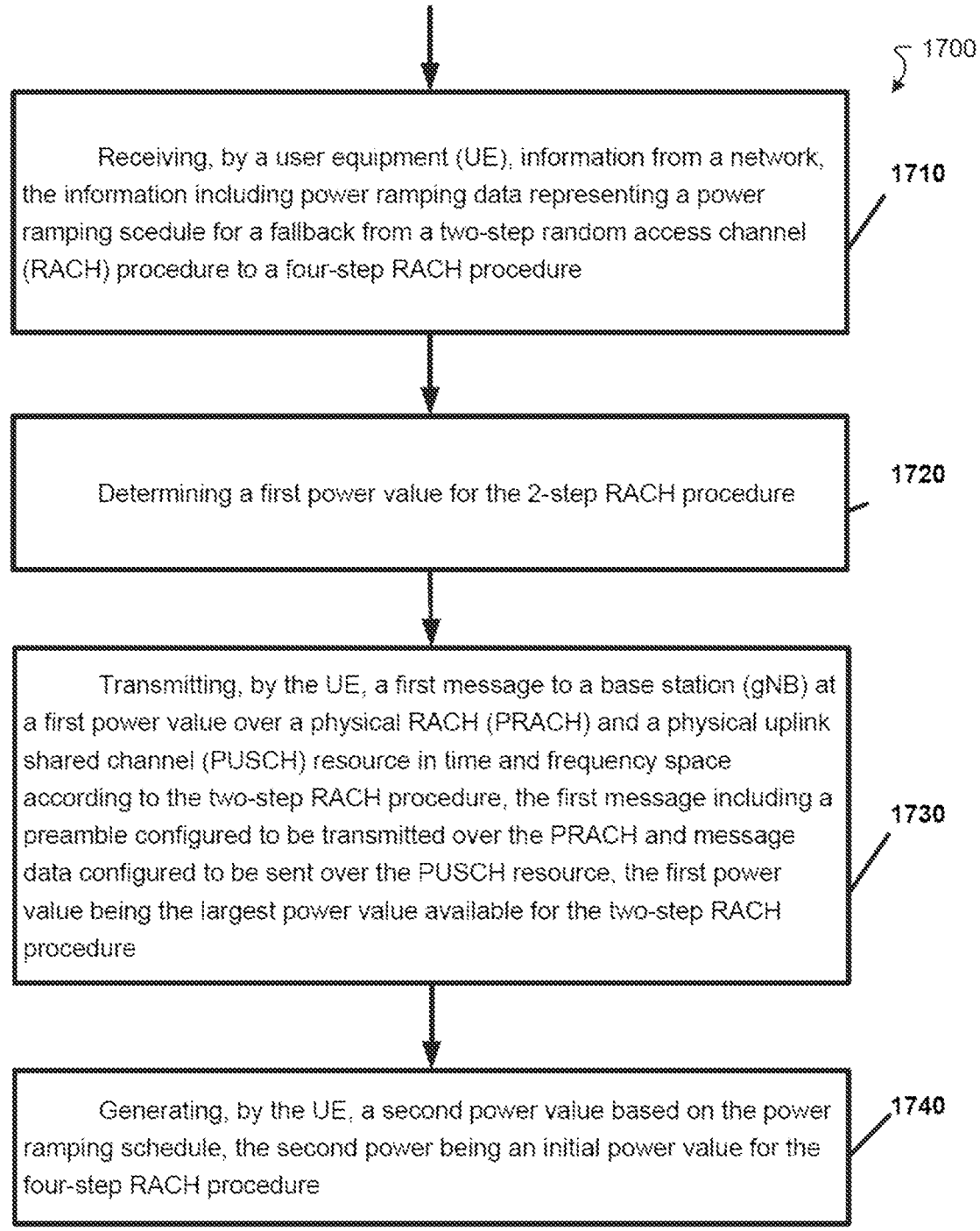
FIG. 17 is a flow chart illustrating a method of performing a fallback 4-step RACH procedure according to an example implementation.

FIG. 17 is a flow chart illustrating a method of performing a fallback 4-step RACH procedure according to an example implementation.

Example 1: At 1710, a UE receives information from a network, the information including power ramping data representing a power ramping configuration for a scheme that enables fallback from a 2-step random access channel (RACH) procedure to a 4-step RACH procedure. At 1720, the UE determines a first power value for the 2-step RACH. At 1730, the UE transmits a first message to a base station (gNB) at a first power value over a physical RACH (PRACH) and a physical uplink shared channel (PUSCH) resource in time and frequency space according to the 2-step RACH procedure, the first message including a preamble configured to be transmitted over the PRACH and message data configured to be sent over the PUSCH resource. At 1740, the UE generates a second power value based on the power ramping configuration, the second power being an initial power value for the 4-step RACH procedure.

Example 2: According to an example implementation of example 1, wherein the first power value is greater than the second power value.

Example 3: According to an example implementation of examples 1 or 2, wherein the power ramping configuration specifies a threshold number of times a message transmission is attempted in the 2-step RACH procedure before transitioning to the 4-step RACH procedure.

Example 4: According to an example implementation of any of examples 1-3, wherein the power ramping configuration specifies a threshold power value before transitioning to the 4-step RACH procedure.

Example 5: According to an example implementation of any of examples 1-4, wherein the transmitting of the first message to the gNB is performed using a first beam; and wherein the transmitting of the second message is performed using the first beam.

Example 6: According to an example implementation of example 5, wherein generating the second power value includes increasing the power value used for transmission over the first beam to produce the second power value.

Example 7: According to an example implementation of any of examples 1-6, wherein the transmitting of the first message to the gNB is performed using a first beam; and wherein the transmitting of the second message includes sending the second message over a second beam different from the first beam.

Example 8: According to an example implementation of example 7, wherein sending the second message over the second beam includes using substantially the same power transmitted over the first beam.

Example 9: According to an example implementation of example 7, wherein sending the second message over the second beam includes increasing the power transmitted over the first beam to produce the second power, the second power being based on a power increment in the 2-step RACH scheme.

Example 10: According to an example implementation of example 7, wherein sending the second message over the second beam includes decreasing the power transmitted over the first beam to produce the second power, the second power being substantially equal to an initial power used to begin the 2-step RACH procedure.

Example 11: According to an example implementation of any of examples 1-10, wherein the information received from the network includes a specified power offset value between the 2-step RACH procedure and the 4-step RACH procedure.

Example 12: According to an example implementation of any of examples 1-11, wherein the information received from the network includes a specified initial power value for the 4-step RACH procedure.

Example 13: According to an example implementation of any of examples 1-12, wherein transmitting the first message to the gNB at the first power value over the PRACH and the PUSCH resource in time and frequency space according to the 2-step RACH procedure includes: sending the preamble over the PRACH at a preamble power value; and sending the message data over the PUSCH resource at a power value incremented by a specified amount over the preamble power value, a sum of the preamble power value and the specified amount being equal to the first power value.

Example 14: According to an example implementation of any of examples 1-13, further comprising: selecting, as the PRACH over which the preamble of the first message is sent, a PRACH opportunity (RO) of a plurality of ROs, each of the plurality of ROs corresponding to a respective time offset and respective frequency, the RO being in a PRACH slot; and mapping, as the PUSCH resource over which the message data of the first message is sent, the RO to a PO of the plurality of POs based on the time offset and frequency of the selected RO.

Example 15: According to an example implementation of example 14, wherein a mapping of each of the plurality of ROs occurs prior to an occurrence of another PRACH slot.

Example 16: According to an example implementation of examples 14 or 15, wherein mapping the PO includes determining a time offset for the PO, the time offset for the PO being between the time offset of the selected RO and a time offset of another PO that is mapped to a first RO within the PRACH slot.

Example 17: According to an example implementation of example 16, wherein a time offset for each of the plurality of POs is determined using a first semi-static value, and wherein the method further comprises using a second semi-static value to determine a frequency offset for each of the plurality of POs between a start of the first RO in frequency space and a start of each of the plurality of POs in frequency space.

Example 18: According to an example implementation of example 17, wherein the mapping of the PO is performed frequency first and time second.

Example 19: According to an example implementation of example 16, wherein a frequency offset for each of the plurality of POs is determined based on a frequency to which the RO corresponds, and wherein a time offset for each of the plurality of POs is determined using a first semi-static value to be between a start of the first RO in a time domain and a start of the plurality of POs.

Example 20: According to an example implementation of any of examples 14-19, wherein the PO is not available, and in response to the PO not being available, skipping the PO when mapping PRACH preambles and POs to ROs.

Example 21: According to an example implementation of example 3, wherein the first power value for the 2-step RACH procedure is determined from the threshold number of times the message transmission is attempted.

Example 22: According to an example implementation of example 1, wherein the first power value for the 2-step RACH procedure is determined from a configuration of the network.

Example 23: An apparatus comprising means for performing a method of any of examples 1-22.

Example 24: A computer program product including a non-transitory computer-readable storage medium and storing executable code that, when executed by at least one data processing apparatus, is configured to cause the at least one data processing apparatus to perform a method of any of claims 1-22.

Further example implementations and/or example details will now be provided.

LIST OF EXAMPLE ABBREVIATIONS

Figure 18:
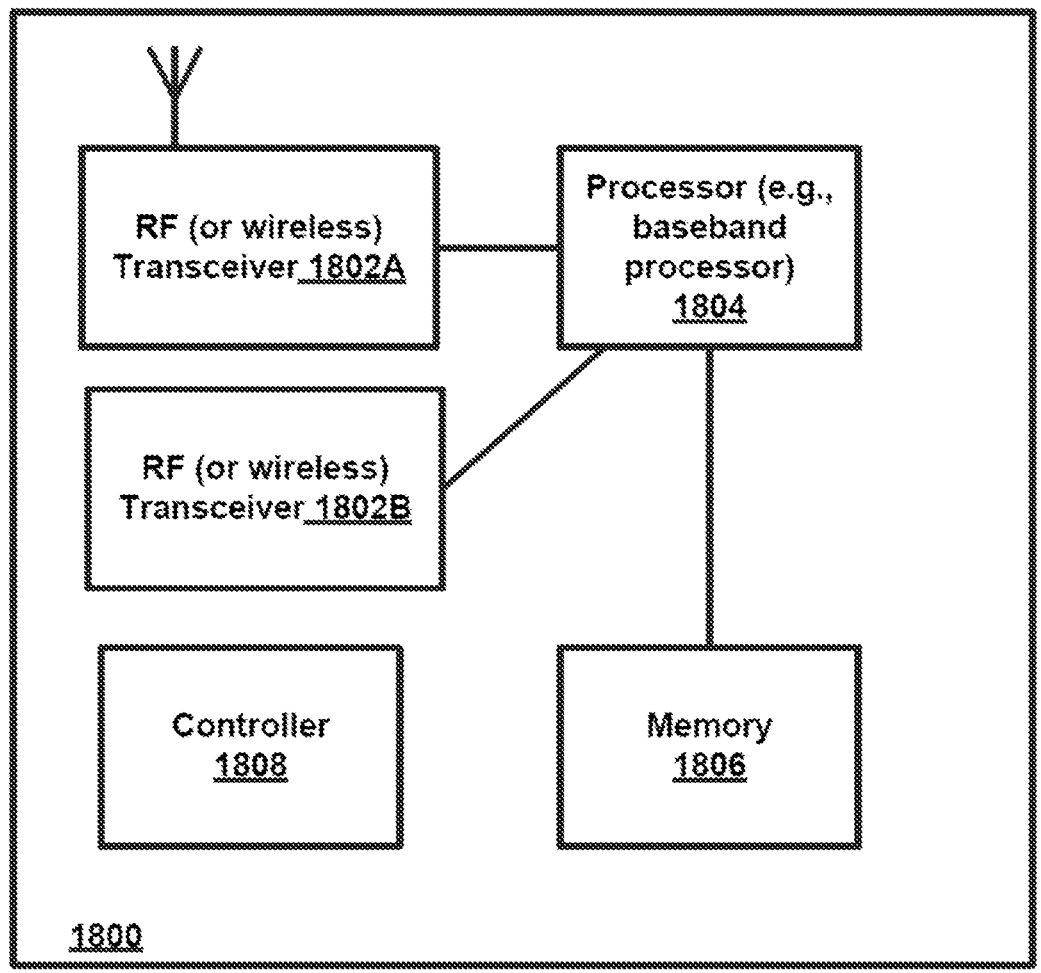
FIG. 18 is a block diagram of a node or wireless station (e.g., base station/access point, relay node, or mobile station/user device) according to an example implementation.

3GPP: third generation partnership project
4G: fourth generation of mobile telecommunication technology
5G: fifth generation of mobile telecommunication technology
5GMM: 5GS mobility management
5GS: 5G system
5GSM: 5GS session management
ACB: access class barring
AMF: access and mobility management function
CSFB: circuit switched fallback
DM: device management
DN: data network
DNN: data network name
EHPLMN: equivalent HPLMN
eMBB: enhanced mobile broadband
eNB: evolved Node B
EPS: evolved packet system
gNB: next generation Node B (uncertain)
HPLMN home PLMN
IMS: IP multimedia subsystem
IoT: internet of things
IP: internet protocol
MME: mobility management entity
MMTel: IMS multimedia telephony service
NAS: non-access stratum
NGAP: next generation application protocol
NSSAI: network slice selection assistance information
OAM: operations, administration, and management
OMA: open mobile alliance
OS: operating system
PCF: policy control function
PDU: protocol data unit
PLMN public land mobile network
RAN: radio access network
RRC: radio resource control
S-NSSAI: single NSSAI
SD: slice differentiator
SMS: short message service
SMSoNAS: SMS over NAS
SMSoIP: SMS over IP
SSAC: service specific access control
SST: slice/service type
UDM: user data management
UE: user equipment
UPF: user plane function
URLLC: ultra-reliable and low latency communication
VPLMN: visited PLMN FIG. 18 is a block diagram of a wireless station (e.g., AP, BS, eNB, UE or user device) 1800 according to an example implementation. The wireless station 1800 may include, for example, one or two RF (radio frequency) or wireless transceivers 1802A, 1802B, where each wireless transceiver includes a transmitter to transmit signals and a receiver to receive signals. The wireless station also includes a processor or control unit/entity (controller) 1804 to execute instructions or software and control transmission and receptions of signals, and a memory 1806 to store data and/or instructions.

Processor 1804 may also make decisions or determinations, generate frames, packets or messages for transmission, decode received frames or messages for further processing, and other tasks or functions described herein. Processor 1804, which may be a baseband processor, for example, may generate messages, packets, frames or other signals for transmission via wireless transceiver 1802 (1802A or 1802B). Processor 904 may control transmission of signals or messages over a wireless network, and may control the reception of signals or messages, etc., via a wireless network (e.g., after being down-converted by wireless transceiver 1802, for example). Processor 1804 may be programmable and capable of executing software or other instructions stored in memory or on other computer media to perform the various tasks and functions described above, such as one or more of the tasks or methods described above. Processor 1804 may be (or may include), for example, hardware, programmable logic, a programmable processor that executes software or firmware, and/or any combination of these. Using other terminology, processor 1804 and transceiver 1802 together may be considered as a wireless transmitter/receiver system, for example.

In addition, referring to FIG. 18, a controller (or processor) 1808 may execute software and instructions, and may provide overall control for the station 1800, and may provide control for other systems not shown in FIG. 18, such as controlling input/output devices (e.g., display, keypad), and/or may execute software for one or more applications that may be provided on wireless station 1800, such as, for example, an email program, audio/video applications, a word processor, a Voice over IP application, or other application or software.

In addition, a storage medium may be provided that includes stored instructions, which when executed by a controller or processor may result in the processor 1804, or other controller or processor, performing one or more of the functions or tasks described above.

According to another example implementation, RF or wireless transceiver(s) 1802A/1802B may receive signals or data and/or transmit or send signals or data. Processor 1804 (and possibly transceivers 1802A/1802B) may control the RF or wireless transceiver 1802A or 1802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. A method, comprising:
receiving, by a user equipment, information from a network, the information including power ramping data representing a power ramping configuration for a scheme that enables fallback from a 2-step random access channel procedure to a 4-step random access channel procedure;
determining a first power value for the 2-step random access channel procedure;
transmitting, by the user equipment, a first message to a base station at the first power value over a physical random access channel and a physical uplink shared channel resource in time and frequency space according to the 2-step random access channel procedure, the first message including a preamble configured to be transmitted over the physical random access channel and message data configured to be sent over the physical uplink shared channel resource; and
generating, by the user equipment, a second power value based on the power ramping configuration, the second power value being an initial power value for the 4-step random access channel procedure;
wherein the second power value is generated based on a 2-step-to-4-step fallback power offset value added to a previously-used power value for the 2-step random access channel procedure.

2. An apparatus, comprising:
at least one processor; and
at least one memory including computer program code;
the at least one memory and the computer program code configured to, with the at least one processor, cause the apparatus at least to:
receive information from a network, the information including power ramping data representing a power ramping configuration for a scheme that enables fallback from a 2-step random access channel procedure to a 4-step random access channel procedure;
determine a first power value for the 2-step random access channel procedure;
transmit a first message to a base station at the first power value over a physical random access channel and a physical uplink shared channel resource in time and frequency space according to the 2-step random access channel procedure, the first message including a preamble configured to be transmitted over the physical random access channel and message data configured to be sent over the physical uplink shared channel resource; and
generate a second power value based on the power ramping configuration, the second power value being an initial power value for the 4-step random access channel procedure;
wherein the second power value is generated based on a 2-step-to-4-step fallback power offset value added to a previously-used power value for the 2-step random access channel procedure.

3. The apparatus as in claim 2, wherein the first power value is greater than the second power value.

4. The apparatus as in claim 2, wherein the power ramping configuration specifies a threshold number of times a message transmission is attempted in the 2-step random access channel procedure before transitioning to the 4-step random access channel procedure.

5. The apparatus as in claim 2, wherein the power ramping configuration specifies a threshold power value before transitioning to the 4-step random access channel procedure.

6. The apparatus as in claim 2, wherein the at least one processor configured to generate the second power value is further configured to increase a power value used for transmission over the first beam to produce the second power value.

7. The apparatus as in claim 2, wherein the at least one processor is configured to transmit the first message to the base station using the first beam; and
wherein the at least one processor configured to transmit the second message is further configured to send the second message over a second beam different from the first beam.

8. The apparatus as in claim 7, wherein the at least one processor configured to send the second message over the second beam is further configured to use substantially the same power value transmitted over the first beam.

9. The apparatus as in claim 7, wherein the at least one processor configured to send the second message over the second beam is further configured to increase the power value transmitted over the first beam to produce the second power value, the second power value being based on a power increment in the 2-step random access channel procedure.

10. The apparatus as in claim 7, wherein the at least one processor configured to send the second message over the second beam is further configured to decrease the power value transmitted over the first beam to produce the second power value, the second power value being substantially equal to an initial power value used to begin the 2-step random access channel procedure.

11. The apparatus as in claim 2, wherein the information received from the network includes a specified power offset value between the 2-step random access channel procedure and the 4-step random access channel procedure.

12. The apparatus as in claim 2, wherein the information received from the network includes a specified initial power value for the 4-step random access channel procedure.

13. The apparatus as in claim 2, wherein the at least one processor configured to transmit the first message to the base station at the first power value over the physical random access channel and the physical uplink shared channel resource in time and frequency space according to the 2-step random access channel procedure is further configured to:
    send the preamble over the physical random access channel at a preamble power value; and
    send the message data over the physical uplink shared channel resource at a power value offset by a specified amount over the preamble power value, a sum of the preamble power value and the specified amount being equal to the first power value.

14. The apparatus as in claim 2, wherein the at least one processor is further configured to:
    select, as the physical random access channel over which the preamble of the first message is sent, a physical random access channel opportunity of a plurality of physical random access channel opportunities, each of the plurality of physical random access channel opportunities corresponding to a respective time offset and respective frequency, the physical random access channel opportunity being in a physical random access channel slot; and
    map, as the physical uplink shared channel resource over which the message data of the first message is sent, the physical random access channel opportunity to a physical uplink shared channel occasion of the plurality of physical uplink shared channel occasions based on the time offset and frequency of the selected physical random access channel opportunity.

15. The apparatus as in claim 14, wherein a mapping of each of the plurality of physical random access channel opportunities occurs prior to an occurrence of another physical random access channel slot.

16. The apparatus as in claim 14, wherein mapping the physical uplink shared channel occasion includes determining a time offset for the physical uplink shared channel occasion, the time offset for the physical uplink shared channel occasion being between the time offset of the selected physical random access channel opportunity and a time offset of another physical uplink shared channel occasion that is mapped to a first physical random access channel opportunity within the physical random access channel slot.

17. The apparatus as in claim 16, wherein a time offset for each of the plurality of physical uplink shared channel occasions is determined using a first semi-static value, and
    wherein the apparatus is further configured use a second semi-static value to determine a frequency offset for each of the plurality of physical uplink shared channel occasions between a start of the first physical random access channel opportunity in frequency space and a start of each of the plurality of physical uplink shared channel occasions in frequency space.

18. The apparatus as in claim 17, wherein the mapping of the physical uplink shared channel occasion is performed frequency first and time second.

19. A computer program product including a non-transitory computer-readable storage medium and storing executable code that, when executed by at least one data processing apparatus, is configured to cause the at least one data processing apparatus to:
    receive information from a network, the information including power ramping data representing a power ramping configuration for a scheme that enables fallback from a 2-step random access channel procedure to a 4-step random access channel procedure;
    determine a first power value for the 2-step random access channel procedure;
    transmit a first message to a base station at the first power value over a physical random access channel and a physical uplink shared channel resource in time and frequency space according to the 2-step random access channel procedure, the first message including a preamble configured to be transmitted over the physical random access channel and message data configured to be sent over the physical uplink shared channel resource; and
    generate a second power value based on the power ramping configuration, the second power value being an initial power value for the 4-step random access channel procedure;
    wherein the second power value is generated based on a 2-step-to-4-step fallback power offset value added to a previously-used power value for the 2-step random access channel procedure.

* * * * *